(12) United States Patent
Chen et al.

(10) Patent No.: US 11,360,599 B2
(45) Date of Patent: Jun. 14, 2022

(54) TOUCH DISPLAY DEVICE

(71) Applicant: HANNSTAR DISPLAY CORPORATION, Taipei (TW)

(72) Inventors: I-Hsuan Chen, Kaohsiung (TW); Mu-Kai Kang, Tainan (TW); Cheng-Yen Yeh, Taichung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 17/380,049

(22) Filed: Jul. 20, 2021

(65) Prior Publication Data
US 2021/0349565 A1 Nov. 11, 2021

Related U.S. Application Data

(63) Continuation of application No. 16/920,761, filed on Jul. 6, 2020, now Pat. No. 11,106,304, which is a (Continued)

(30) Foreign Application Priority Data

Mar. 5, 2018 (CN) .......................... 201810178360.9

(51) Int. Cl.
*G06F 3/041* (2006.01)
*G06F 3/047* (2006.01)
(Continued)

(52) U.S. Cl.
CPC ............ *G06F 3/0412* (2013.01); *G06F 3/044* (2013.01); *G06F 3/047* (2013.01); *G06F 3/0416* (2013.01);
(Continued)

(58) Field of Classification Search
CPC ...... G06F 3/0412; G06F 3/0416; G06F 3/044; G06F 3/047; G06F 2203/04111; G02F 1/13338

See application file for complete search history.

(56) References Cited

U.S. PATENT DOCUMENTS 9,329,424 B2   5/2016   Chae
2010/0013789 A1   1/2010   Chung
(Continued)

FOREIGN PATENT DOCUMENTS

CN   101320185 A   12/2008
CN   104793421 A   7/2015
(Continued)

*Primary Examiner* — Sejoon Ahn
(74) *Attorney, Agent, or Firm* — Winston Hsu

(57) ABSTRACT

A touch display device includes a substrate, a plurality of touch electrodes, a plurality of touch signal lines and a plurality of dummy signal lines disposed on the substrate. The touch electrodes are arranged in i number of touch electrode columns and j number of touch electrode rows, the touch signal lines and the dummy signal lines are divided into i number of groups, each of the groups includes j number of touch signal lines and k number of dummy signal lines, and j number of touch signal lines are disposed between a portion of the k number of dummy signal lines and a remaining portion of the k number of dummy signal lines in each of the i number of groups, wherein i, j, and k are positive integers greater than or equal to two.

18 Claims, 18 Drawing Sheets

Related U.S. Application Data continuation-in-part of application No. 16/283,811, filed on Feb. 24, 2019, now Pat. No. 10,747,350.

(51) Int. Cl.
  *G06F 3/044* (2006.01)
  *G02F 1/1333* (2006.01)

(52) U.S. Cl.
  CPC .............................. *G02F 1/13338* (2013.01); *G06F 2203/04111* (2013.01)

(56) References Cited

U.S. PATENT DOCUMENTS

| | | |
|---|---|---|
| 2013/0075763 A1 | 3/2013 | Jeong |
| 2016/0357286 A1 | 12/2016 | Tsai |
| 2017/0090635 A1 | 3/2017 | Kim |
| 2018/0120995 A1 | 5/2018 | Lee |
| 2018/0366083 A1 | 12/2018 | Lai |
| 2018/0373079 A1 | 12/2018 | Yeh |
| 2019/0339808 A1* | 11/2019 | Park ................ G06F 3/0412 |
| 2019/0339812 A1* | 11/2019 | Chen ................ G09G 3/2074 |

FOREIGN PATENT DOCUMENTS

| | | |
|---|---|---|
| CN | 105807979 A | 7/2016 |
| CN | 105892120 A | 8/2016 |
| CN | 205665503 U | 10/2016 |
| CN | 106249454 A | 12/2016 |
| CN | 106842736 A | 6/2017 |
| CN | 107085487 A | 8/2017 |
| CN | 206557510 U | 10/2017 |
| CN | 107544697 A | 1/2018 |
| KR | 10-2013-0034263 A | 4/2013 |

* cited by examiner

TOUCH DISPLAY DEVICE

CROSS REFERENCE TO RELATED APPLICATIONS

This application is a continuation application and claims priority of U.S. patent application Ser. No. 16/920,761, filed on Jul. 6, 2020, which is a continuation-in-part and claims priority of U.S. patent application Ser. No. 16/283,811, filed on Feb. 24, 2019, and the entire contents of which are incorporated herein by reference.

BACKGROUND OF THE INVENTION

1. Field of the Invention

The present invention relates to a touch display device, and more particularly, to an in-cell touch display device that can reduce the difference in RC loading between different portions.

2. Description of the Prior Art

Touch devices have been widely applied to display panels of all kinds of electronic products to form touch display devices. This allows users to communicate directly with electronic products instead of using traditional input devices such as a keyboard or mouse. The volume of electronic products can thereby be reduced and the convenience of communication between human and computer can be enhanced. In recent years, the industry has been devoted to developing an in-cell touch display device, wherein the touch device is integrated into the display panel to minimize the volume of the touch display device.

Among currently available in-cell touch display devices, one structure includes a common electrode of the display panel, divided into multiple touch electrodes arranged like a checker board, in which the touch electrodes are separated from each other. In this structure, a portion inside the touch electrode overlaps conductive lines of other conductive layers in the vertical projection direction, and the pattern or area of this overlapping portion inside the touch electrode may be different from those of the portion at the edge of the touch electrode; different areas therefore cause different RC (Resistive-Capacitive) loadings in different portions of the touch electrode. Signals will be transmitted differently at the edge of the touch electrode compared to within the touch electrode, making the signal processing harder.

SUMMARY OF THE INVENTION

It is therefore an objective of the present invention to solve the above-mentioned technical problem by reducing the difference in signal transmission or RC loading between the edges of touch electrodes and inside the touch electrodes in the touch display device.

In order to accomplish this, the present invention provides a touch display device including a display region and a peripheral region. The touch display device includes a substrate, a plurality of scan lines, a plurality of data lines, a plurality of thin film transistors, a plurality of pixel electrodes, a plurality of touch electrodes, a plurality of touch signal lines and a plurality of dummy signal lines. The plurality of scan lines and the plurality of data lines are disposed on the substrate. The plurality of thin film transistors are disposed on the substrate, wherein each of the thin film transistors is electrically connected to a corresponding scan line of the plurality of scan lines and a corresponding data line of the plurality of data lines. The plurality of pixel electrodes are disposed on the substrate and in the display region, wherein each of the pixel electrodes is electrically connected to a drain of a corresponding thin film transistor of the plurality of thin film transistors. The plurality of touch electrodes and the plurality of touch signal lines are disposed on the substrate, wherein each of the touch signal lines is electrically connected to a corresponding touch electrode of the plurality of touch electrodes. The plurality of dummy signal lines are disposed on the substrate. The plurality of touch electrodes are arranged in i number of touch electrode columns in a first direction and arranged in j number of touch electrode rows in a second direction, the first direction is not parallel to the second direction, the plurality of touch signal lines and the plurality of dummy signal lines are divided into i number of groups in the first direction, each of the i number of groups comprises j number of touch signal lines of the plurality of touch signal lines and k number of dummy signal lines of the plurality of dummy signal lines, and the j number of touch signal lines are disposed between a portion of the k number of dummy signal lines and a remaining portion of the k number of dummy signal lines in each of the i number of groups, wherein i, j, and k are positive integers greater than or equal to two.

In order to accomplish this, the present invention provides a touch display device including a display region and a peripheral region. The touch display device comprises a substrate, a plurality of scan lines and a plurality of data lines disposed on the substrate, a plurality of thin film transistors disposed on the substrate, a plurality of pixel electrodes disposed on the substrate and in the display region, and a plurality of touch electrodes and a plurality of touch signal lines disposed on the substrate. Each of the thin film transistors is electrically connected to a corresponding scan line of the plurality of scan lines and a corresponding data line of the plurality of data lines, each of the pixel electrodes is electrically connected to a drain of a corresponding thin film transistor of the plurality of thin film transistors, and each of the touch signal lines is electrically connected to a corresponding touch electrode of the plurality of touch electrodes. In the display region, three data lines of the plurality of data lines are located between two touch signal lines of the plurality of touch signal lines, and in the peripheral region, one of the two touch signal lines is at least partially overlapped with one of the three data lines, and two other data lines of the three data lines are at least partially overlapped with each other.

In order to accomplish this, the present invention provides a touch display device. The touch display device includes a display region and a peripheral region disposed by at least one side of the display region. The touch display device includes a substrate, a plurality of scan lines, a plurality of data lines, a plurality of thin film transistors, a first insulating layer, a first transparent conductive layer, a second insulating layer, a plurality of contact holes, a second transparent conductive layer, and a plurality of touch signal lines. The scan lines and the data lines are disposed on the substrate. The thin film transistors are disposed on the substrate, wherein each of the thin film transistors is electrically connected to a corresponding scan line of the plurality of scan lines and a corresponding data line of the plurality of data lines. The first insulating layer is disposed on the thin film transistors. The first transparent conductive layer is disposed on the first insulating layer, wherein the first transparent conductive layer includes a plurality of pixel electrodes disposed in the display region, and each of the pixel electrodes is electrically connected to a drain of one of the thin film transistors. The second insulating layer is disposed on the first insulating layer and the first transparent conductive layer. The contact holes penetrate the first insulating layer and the second insulating layer, wherein each of the contact holes exposes a portion of one of the pixel electrodes and a portion of the drain of one of the thin film transistors. The second transparent conductive layer is disposed on the second insulating layer, wherein the second transparent conductive layer includes a plurality of touch electrodes and a plurality of connecting electrodes, wherein each of the connecting electrodes extends into at least one of the contact holes, and is in contact with the portion of one of the pixel electrodes and the portion of the drain of one of the thin film transistors. The touch signal lines are disposed on the substrate, wherein each of the touch signal lines is electrically to a corresponding touch electrode of the plurality of touch electrodes.

In the touch display device of the present invention, the touch electrodes include the protruding portions at the edges (or the disconnected locations). The overlapping areas of the touch electrodes and the scan lines at the edges of the touch electrodes are equal to the overlapping areas of the touch electrodes and the scan lines inside the touch electrodes, thus the difference between the resistive-capacitive loading of the touch electrodes and the scan lines at the edges of the touch electrodes and the resistive-capacitive loading of the touch electrodes and the scan lines inside the touch electrodes can be reduced, thereby achieving a better signal transmission effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
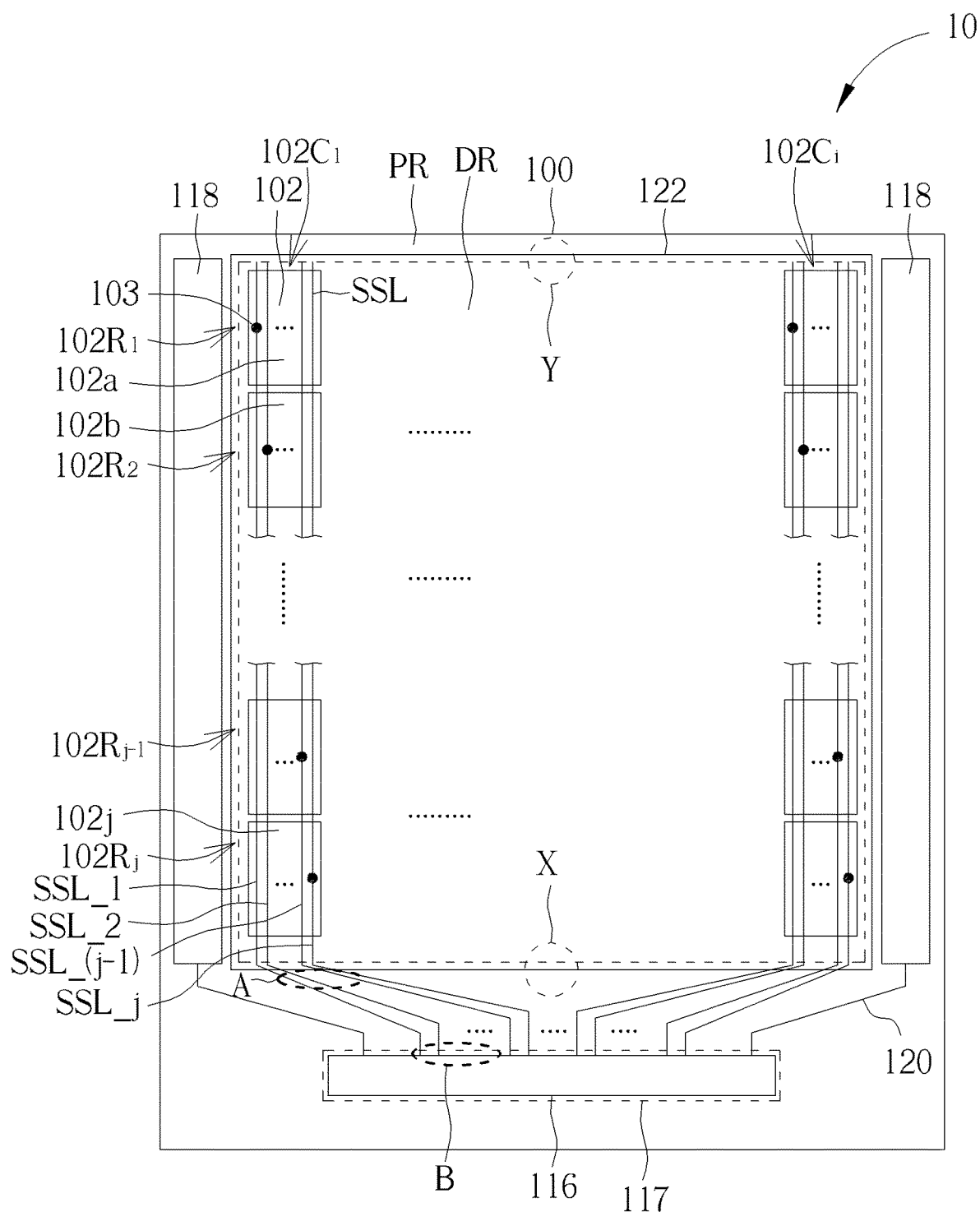
FIG. 1 is a schematic diagram illustrating a top view of a touch display device according to a first embodiment of the present invention.

To provide a better understanding of the present invention to those skilled in the technology, preferred embodiments will be detailed as follows. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

Figure 2:
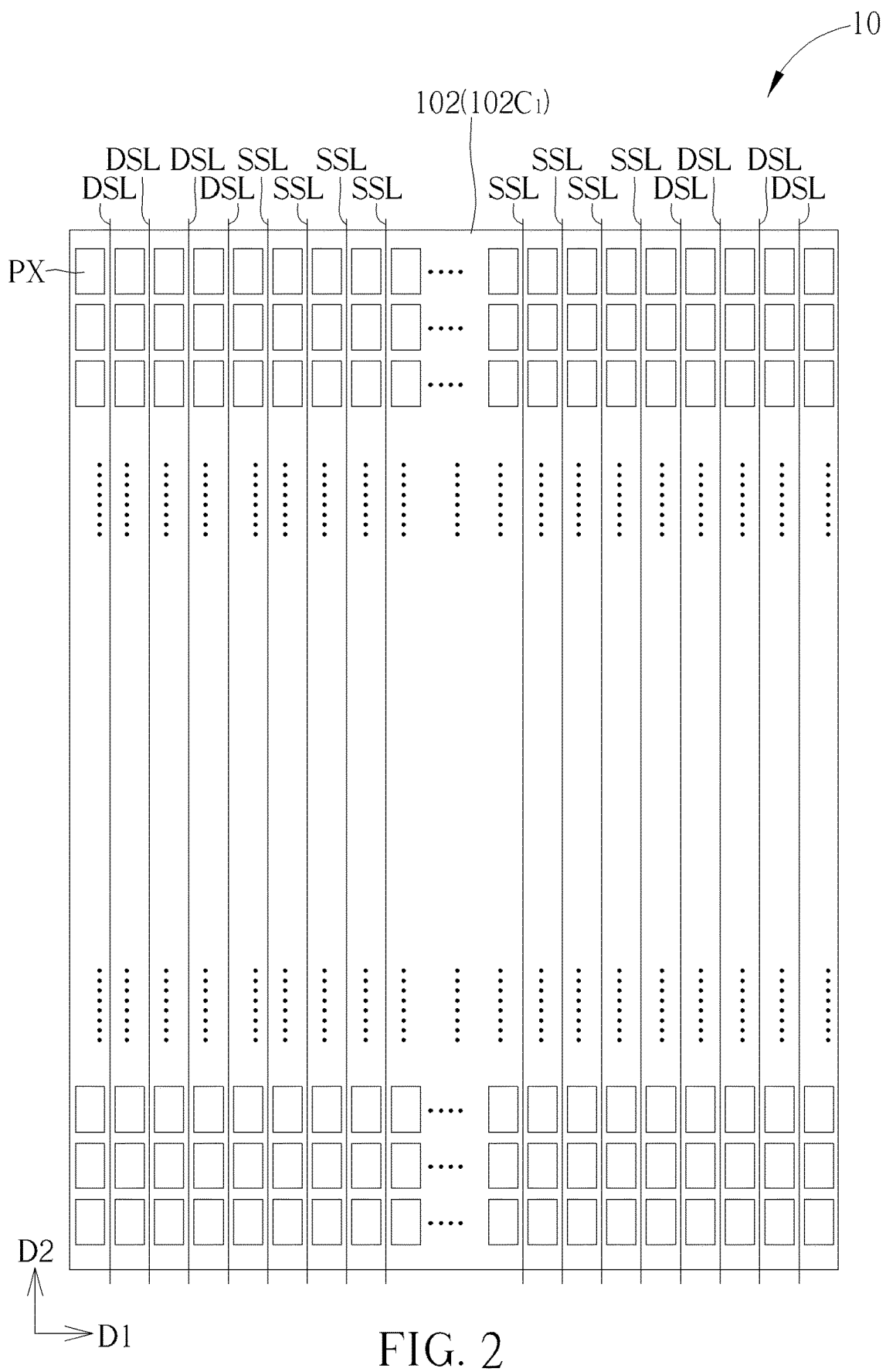
FIG. 2 is a schematic diagram illustrating a top view of one of the touch electrodes of the touch display device according to the first embodiment of the present invention.
Figure 3:
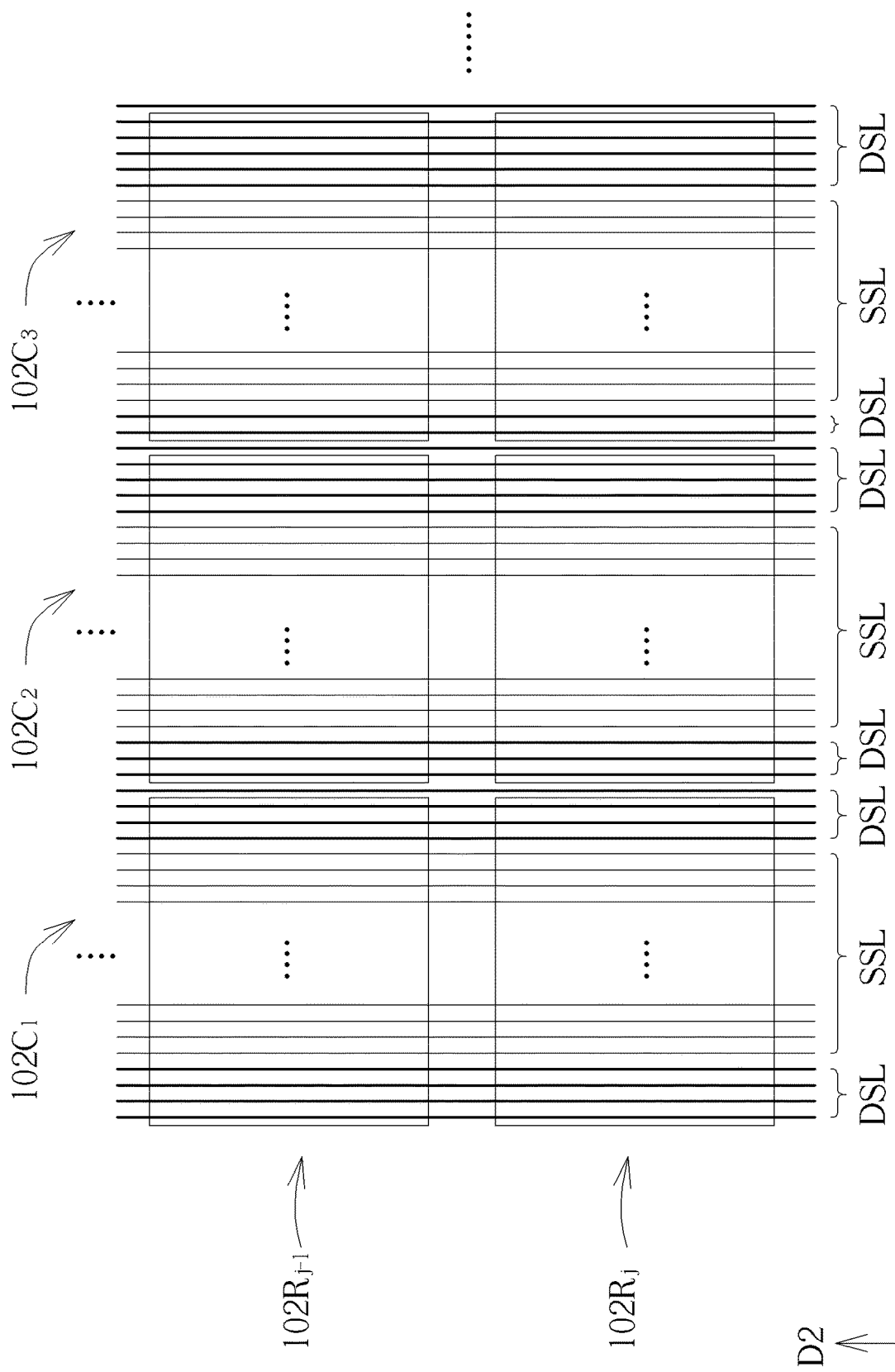
FIG. 3 is a schematic diagram illustrating a top view of touch electrodes, dummy signal lines, and touch signal lines of the touch display device according to the first embodiment of the present invention.
Figure 4:
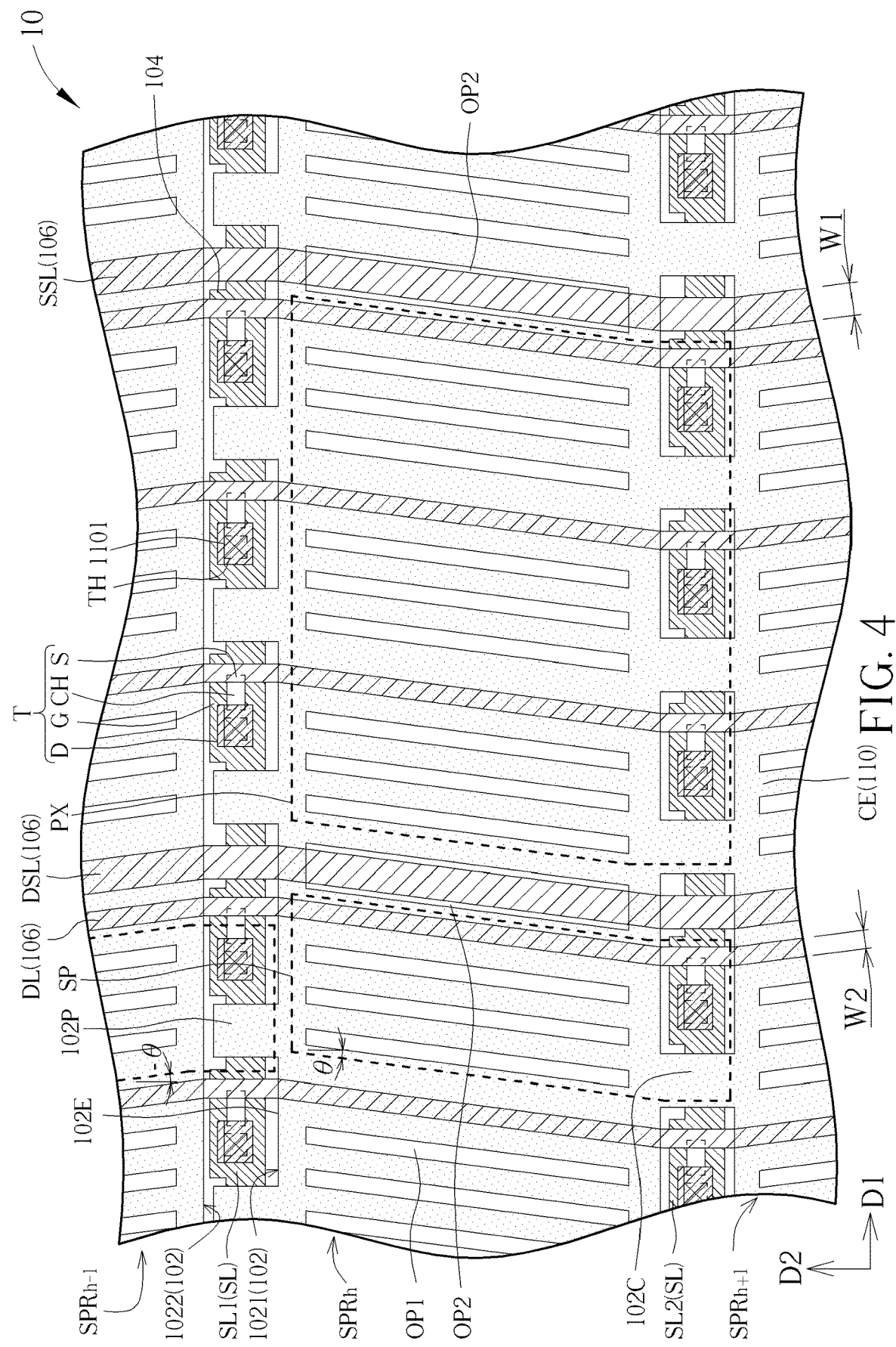
FIG. 4 is a schematic diagram illustrating a top view of a portion of a display region of the touch display device according to the first embodiment of the present invention.
Figure 5:
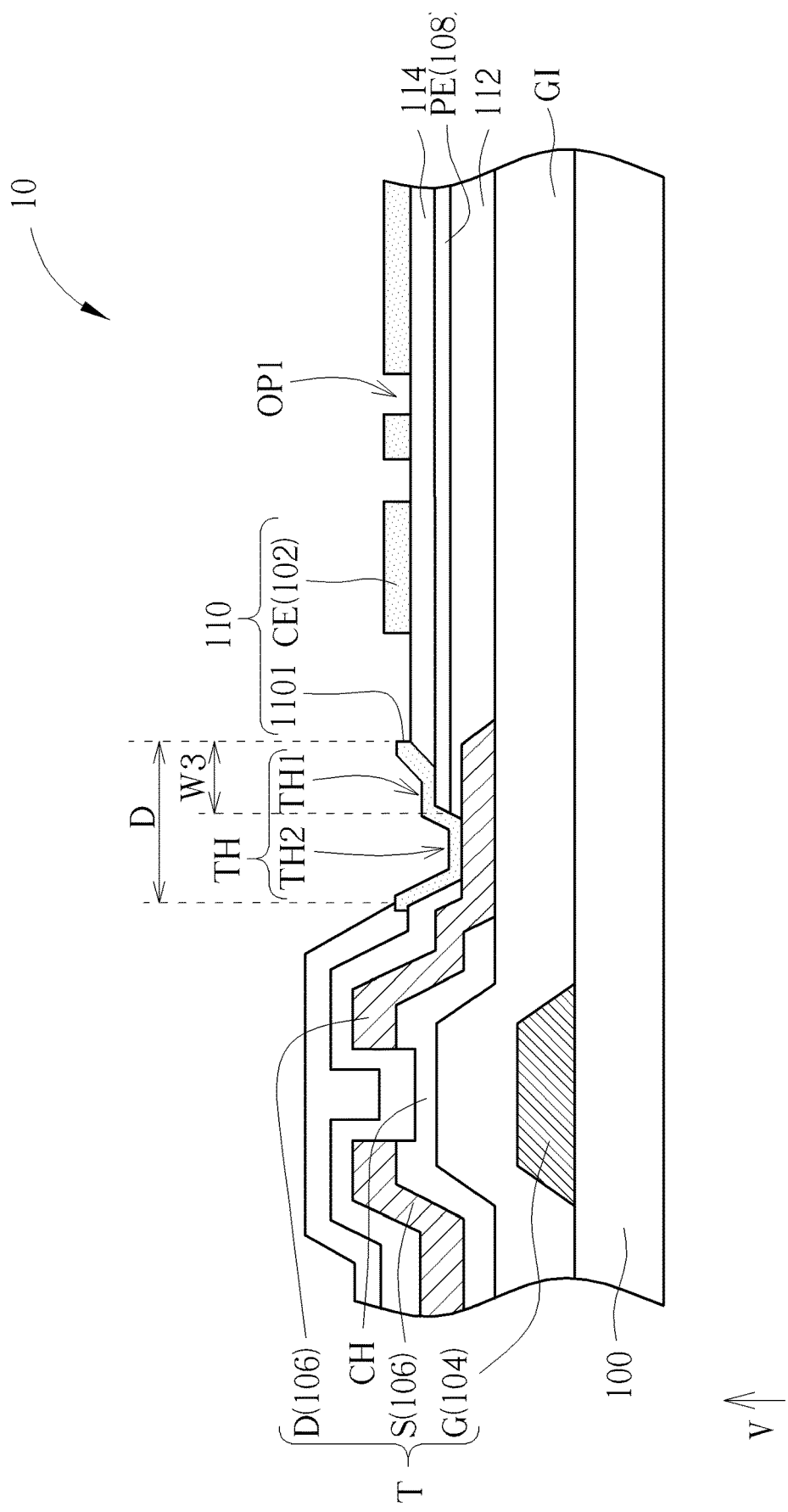
FIG. 5 is a schematic diagram illustrating a cross-sectional view of a sub-pixel of the touch display device according to the first embodiment of the present invention.
Figure 6:
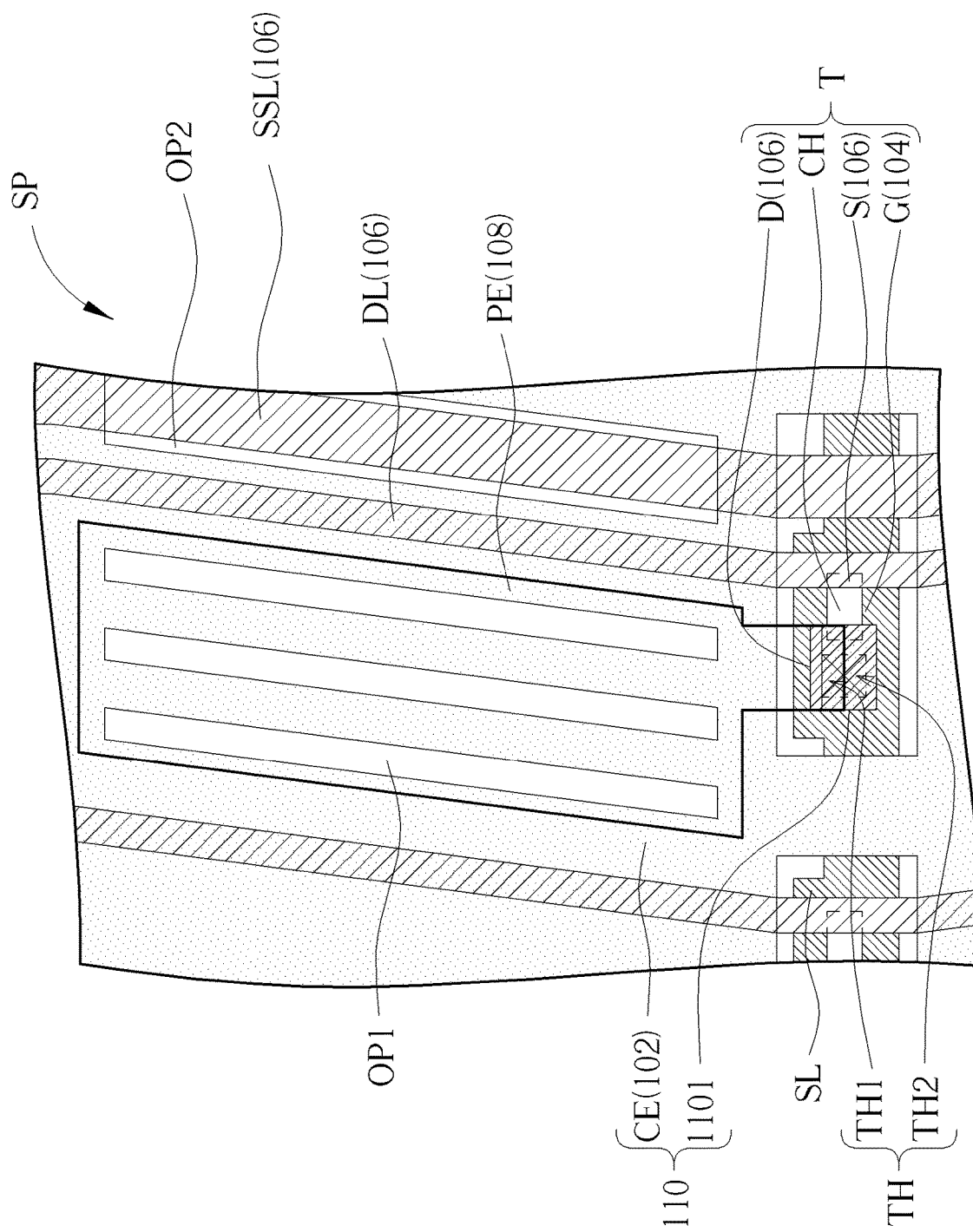
FIG. 6 is a schematic diagram illustrating a top view of a portion of the sub-pixel of the touch display device according to the first embodiment of the present invention.
Figure 7A:
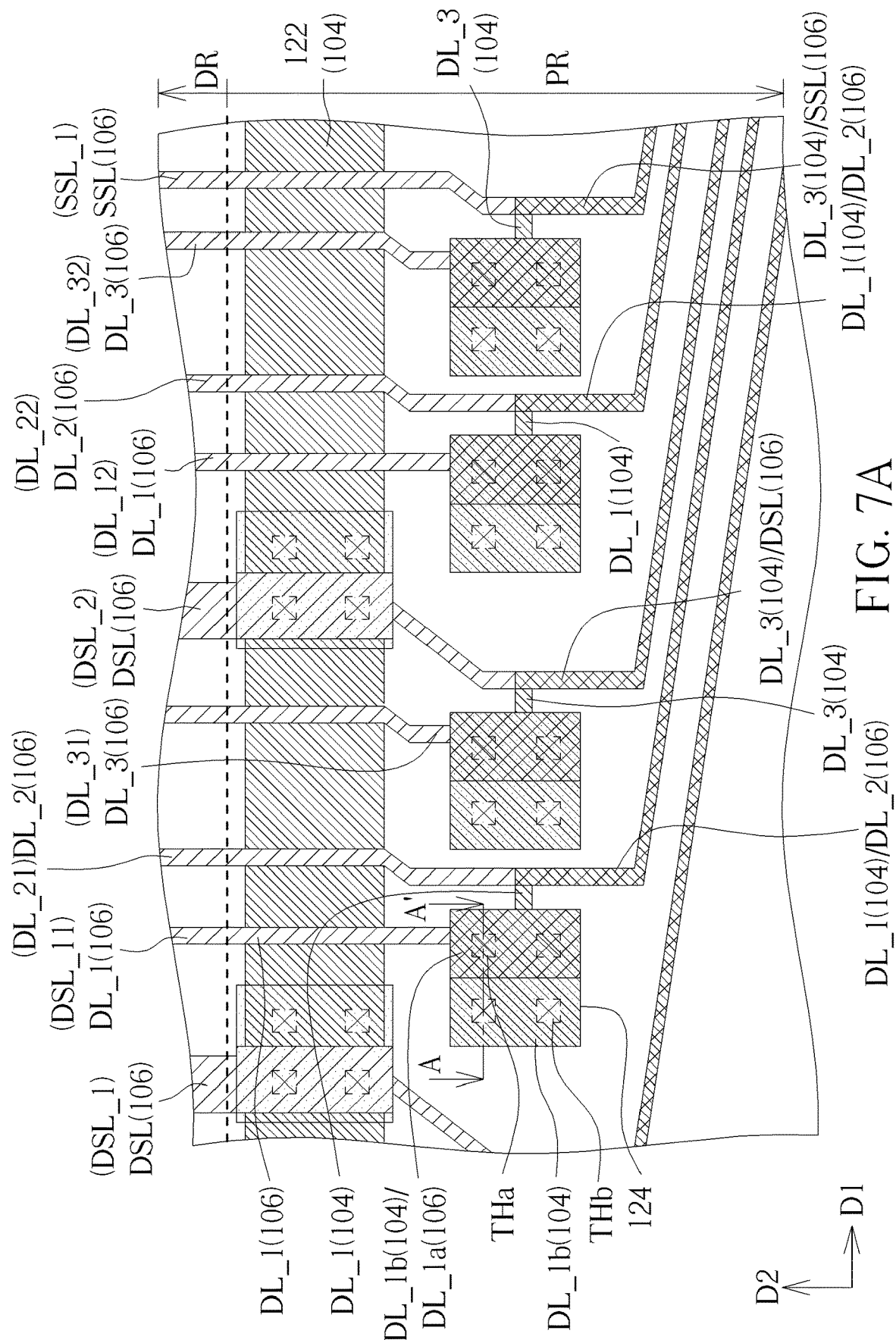
FIG. 7A, FIG. 7B, FIG. 7C and FIG. 7D are schematic diagrams illustrating the configuration of data lines, touch signal lines, dummy signal lines and conductive connecting pads and a cross-sectional view of a metal layer transferring structure of the touch display device according to the first embodiment of the present invention.
Figure 7B:
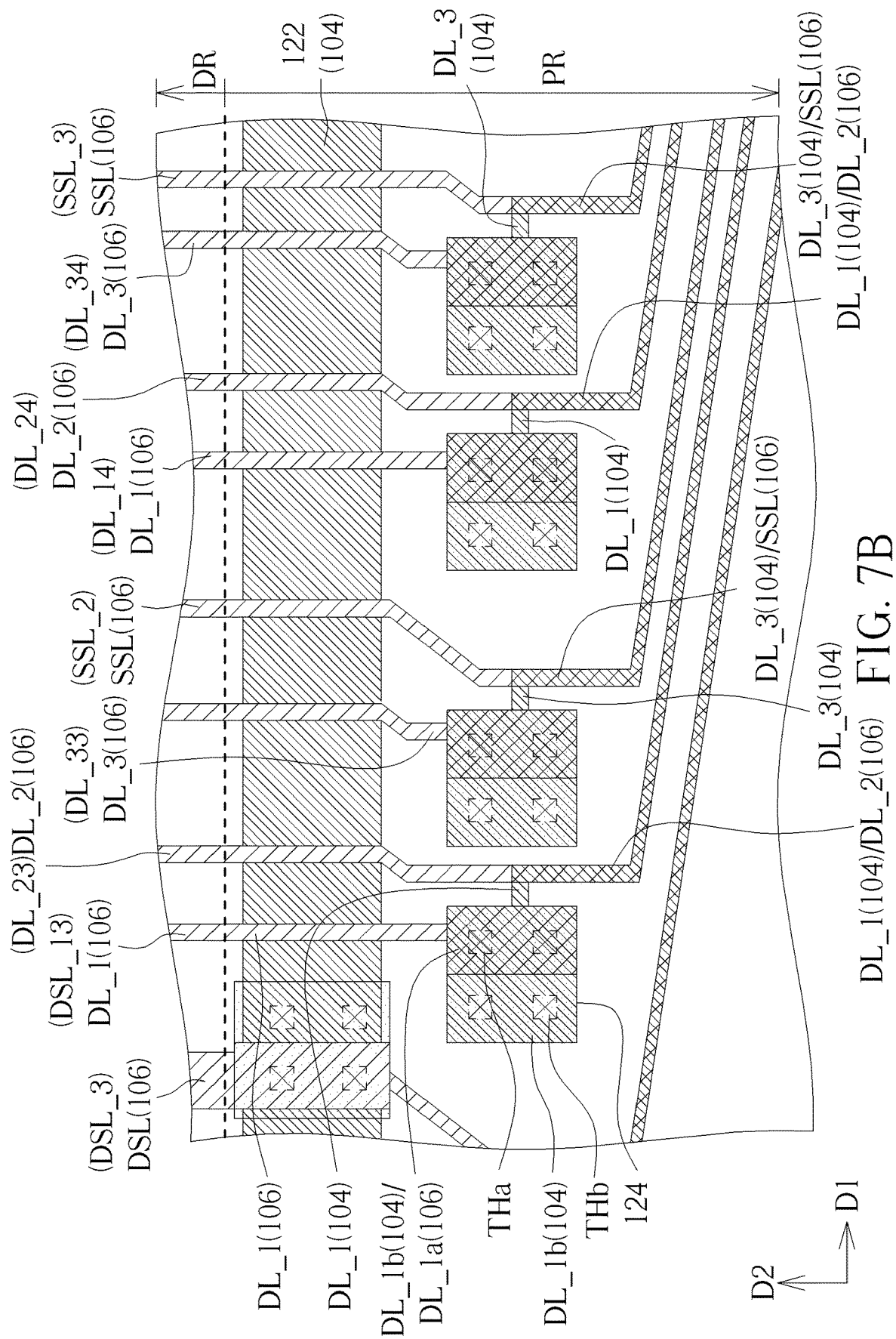

Refer to FIGS. 1-7B. FIG. 1 is a schematic diagram illustrating a top view of a touch display device according to a first embodiment of the present invention, FIG. 2 is a schematic diagram illustrating a top view of one of the touch electrodes of the touch display device according to the first embodiment of the present invention, FIG. 3 is a schematic diagram illustrating a top view of touch electrodes, dummy signal lines, and touch signal lines of the touch display device according to the first embodiment of the present invention, FIG. 4 is a schematic diagram illustrating a top view of a portion of a display region of the touch display device according to the first embodiment of the present invention, FIG. 5 is a schematic diagram illustrating a cross-sectional view of a sub-pixel of the touch display device according to the first embodiment of the present invention, FIG. 6 is a schematic diagram illustrating a top view of a portion of the sub-pixel of the touch display device according to the first embodiment of the present invention, and FIG. 7A and FIG. 7B are schematic diagrams illustrating the configuration of data lines, touch signal lines, dummy signal lines, and conductive connecting pads of the touch display device according to the first embodiment of the present invention. For simplifying the drawings and for ease of comprehension, FIG. 1 only shows touch electrodes 102 and a portion of touch signal lines SSL and omits dummy signal lines DSL in the display region DR, and FIG. 4 omits the first transparent conductive layer 108 and the pixel electrodes PE therein. The touch display device 10 of this embodiment is an in-cell touch display device, but is not limited thereto. As shown in FIG. 1, a substrate 100 of the touch display device 10 includes a display region DR and a peripheral region PR disposed by at least one side of the display region DR. In this embodiment, the peripheral region PR surrounds the display region DR, but it is not limited thereto. The substrate 100 may be a rigid substrate, such as a glass substrate, plastic substrate, quartz substrate, or sapphire substrate, or the substrate 100 may be a flexible substrate including materials such as polyimide (PI) or polyethylene terephthalate (PET) for example, but is not limited thereto. A plurality of touch electrodes 102 are disposed in the display region DR of the substrate 100, and the touch electrodes 102 are separated from each other. The touch electrodes 102 may be arranged in i number of columns and j number of rows, wherein i, j are positive integers greater than or equal to two. Each of the touch electrode rows 102R extends in a first direction D1, each of the touch electrode columns 102C extends in a second direction D2, and the first direction D1 and the second direction D2 are not parallel. The first direction D1 is perpendicular to the second direction D2 in this embodiment, but it is not limited thereto. Additionally, the touch electrodes 102 in this embodiment serve as the common electrodes in the display period of the touch display device 10, and the touch electrodes 102 are used for sensing the location touched by the user in the touch sensing period of the touch display device 10, but this is not limited thereto. The touch display device 10 includes a plurality of touch signal lines SSL disposed on the substrate 100. Each of the touch signal lines SSL substantially extends along the second direction D2, and is electrically connected to a corresponding one of the touch electrodes 102. Accordingly, each of the touch signal lines SSL is electrically connected to a corresponding touch electrode 102 to transmit and/or receive touch related signals. The touch signal lines SSL are not limited to straight lines as shown in FIG. 1 and FIG. 2, however; the touch signal line SSL can extend in a zigzagging fashion along the second direction D2. This will be detailed later. In this embodiment, touch electrodes 102 are arranged in eighteen columns (i=18) and thirty-two rows (j=32), and the number of the touch electrodes 102 are five hundred and seventy-six, but not limited thereto. In other embodiments, the arrangement and/or the number of the touch electrodes 102 may be different according to different designs of the touch display device 10. As shown in FIG. 1, each touch electrode column 102C includes j number of touch electrodes 102, wherein j number of touch signal lines SSL are disposed corresponding to every touch electrode column 102C, and each touch signal line SSL is electrically connected to a corresponding touch electrode 102. As shown in FIG. 1, each touch signal line SSL is electrically connected to the corresponding touch electrode 102 through a connecting structure 103. For example, in an embodiment, the touch signal lines SSL are formed of a metal layer and the touch electrodes 102 are formed of a transparent conductive layer disposed above the metal layer, and at least one insulating layer is disposed between the metal layer and the transparent conductive layer. At least one contact hole can be formed in the insulating layer to expose a portion of the touch signal line SSL. A portion of the transparent conductive layer fills into the at least one contact hole when the transparent conductive layer is formed, so as to form the connecting structure 103 that can electrically connect the touch signal line SSL and the touch electrode 102 formed of different layers, but is not limited thereto. In another embodiment, the touch signal lines SSL are formed of a metal layer and the touch electrodes 102 are formed of a transparent conductive layer disposed below the metal layer, and at least one insulating layer is disposed between the metal layer and the transparent conductive layer. At least one contact hole can be formed in the insulating layer to expose a portion of the touch electrode 102. A portion of the metal layer fills into the at least one contact hole when the metal layer is formed, so as to form the connecting structure 103 that can electrically connect the touch signal line SSL and the touch electrode 102 formed of different layers, but is not limited thereto. In addition, in FIG. 1, each touch signal line SSL penetrates a region corresponding to j number of touch electrodes 102 in one of the touch electrode columns 102C, and each touch signal line SSL is overlapped with j number of touch electrodes 102 in the corresponding touch electrode column 102C in the direction perpendicular to the substrate 100, but this is not limited thereto. As shown in FIG. 1, the touch electrode column $102C_1$ includes j number of touch electrodes 102a-102j, j number of touch signal lines SSL are disposed in a region corresponding to the touch electrode column $102C_1$, the leftmost touch signal line SSL_1 extends in the second direction D2 to be electrically connected to the uppermost touch electrode 102a of the touch electrode column $102C_1$ through a connecting structure 103, and is overlapped with j number of touch electrodes 102 of the touch electrode column $102C_1$. The touch signal line SSL_2 adjacent to the leftmost touch signal line SSL_1 extends in the second direction D2 to be electrically connected to the touch electrode 102b adjacent to the uppermost touch electrode 102a of the touch electrode column $102C_1$ through another connecting structure 103, and further extends to the region corresponding to the uppermost touch electrode 102a, thus the touch signal line SSL_2 is overlapped with j number of touch electrodes 102 of the touch electrode column $102C_1$. The touch signal lines SSL_3-SSL_j are similar to the touch signal line SSL_2 and are overlapped with j number of touch electrodes 102 of the touch electrode column $102C_1$, and therefore description thereof is not repeated. In other embodiments, the leftmost touch signal line SSL_1 is overlapped with j number of touch electrodes 102 of the touch electrode column $102C_1$. The touch signal line SSL_2 extends in the second direction D2 to be electrically connected to the touch electrode 102b and does not extend to the region corresponding to the uppermost touch electrode 102a, thus the touch signal line SSL_2 is overlapped with (j−1) number of touch electrodes 102 of the touch electrode column $102C_1$ (i.e. touch electrodes 102b-102j). The touch signal lines SSL_3-SSL_j are similar to the touch signal line SSL_2 and are respectively overlapped with (j−2) number of touch electrodes 102 to one touch electrode 102 of the touch electrode column $102C_1$, and therefore description thereof is not repeated.

FIG. 2 illustrates a top view of one of the touch electrodes 102, a portion of the dummy signal lines DSL, and a portion of the touch signal lines SSL. The touch electrode 102 in FIG. 2 may be one of the touch electrodes 102 in the first touch electrode column $102C_1$ on the left-side of FIG. 1. As shown in FIG. 2, the touch display device 10 of this embodiment further includes a plurality of dummy signal lines DSL substantially extending along the second direction D2 and substantially parallel to the touch signal lines SSL. The dummy signal lines DSL may also extend in a zigzagging fashion along the second direction D2, but are not limited thereto. Regarding the touch electrode column $102C_1$, the dummy signal lines DSL penetrate a region corresponding to all the touch electrodes 102 in the touch electrode column $102C_1$, but this is not limited thereto. The dummy signal lines DSL are not electrically connected to the touch electrodes 102. In this embodiment, the touch electrodes 102 are arranged in i number of columns and j number of rows, and the touch display device 10 includes plural touch signal lines SSL and plural dummy signal lines DSL, wherein the number of touch signal lines SSL is equal to the product of i and j. The touch signal lines SSL and the dummy signal lines DSL are divided into i number of groups in the first direction D1, each group includes j number of touch signal lines SSL and k number of dummy signal lines DSL, wherein i, j, k are positive integers greater than or equal to two. In a group of the touch signal lines SSL and the dummy signal lines DSL, j number of touch signal lines SSL are disposed between a portion of k number of dummy signal lines DSL and the remaining portion of k number of dummy signal lines DSL. In other words, j number of touch signal lines SSL are disposed between m number of dummy signal lines DSL and (k-m) number of dummy signal lines DSL, wherein m is an integer greater than or equal to one, and m is smaller than k. For example, the number of touch signal lines SSL is five hundred and seventy-six (the product of i and j) when the touch electrodes 102 are arranged in eighteen columns and thirty-two rows (i.e. i is 18 and j is 32). The touch signal lines SSL and the dummy signal lines DSL of the touch display device 10 are divided into eighteen groups in the first direction D1, the number of touch signal lines SSL is thirty-two and the number of dummy signal lines DSL is eight (i.e. k is 8) in each group of the touch signal lines SSL and the dummy signal lines DSL. Thirty-two touch signal lines SSL in a group can be disposed between four dummy signal lines DSL and the remaining four dummy signal lines DSL, three dummy signal lines DSL and the remaining five dummy signal lines DSL, two dummy signal lines DSL and the remaining six dummy signal lines DSL, or one dummy signal line DSL and the remaining seven dummy signal lines DSL, but is not limited thereto. Additionally, the arrangement of the touch signal lines SSL and the dummy signal lines DSL in every group can be the same or different. For example, in an embodiment, j number of touch signal lines SSL in every group of touch signal lines SSL and dummy signal lines DSL can be disposed between m number of dummy signal lines DSL and (k-m) number of dummy signal lines DSL, but this is not limited thereto. In other embodiments, j number of touch signal lines SSL in at least one group can be disposed between m number of dummy signal lines DSL and (k-m) number of dummy signal lines DSL, and j number of touch signal lines SSL in at least another group can be disposed between n number of dummy signal lines DSL and (k-n) number of dummy signal lines DSL, wherein n is an integer greater than or equal to one, n is smaller than k, and n is different from m. Table 1 illustrates arrangements of the touch signal lines and the dummy signal lines of an embodiment in every group in sequence. The numbers in the first row in Table 1 respectively represent every group of the touch signal lines SSL and the dummy signal lines DSL in the first direction D1, and numbers 1-18 represent the groups of the touch signal lines SSL and the dummy signal lines DSL from left to right in the touch display device 10 in FIG. 1 in sequence. The second row in Table 1 illustrates the arrangement of the touch signal lines SSL and the dummy signal lines DSL in each group, the third row in Table 1 illustrates numbers of the touch signal lines SSL and the dummy signal lines DSL according to the arrangement in the second row, and the fourth row in Table 1 illustrates the sum of the number of the touch signal lines SSL and the number of the dummy signal lines DSL.

TABLE 1

| Group | 1 | | | | | | | | | 2 | | | | | | | | | 3 | | | | | | | | |
|---|---|---|---|---|---|---|---|---|---|---|---|---|---|---|---|---|---|---|---|---|---|---|---|---|---|---|---|
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 4 | 32 | 4 | | | | | | | 3 | 32 | 5 | | | | | | | 2 | 32 | 6 | | | | | | |
| Sum | | 40 | | | | | | | | | 40 | | | | | | | | | 40 | | | | | | | |
| Group | 4 | | | | | | | | | 5 | | | | | | | | | 6 | | | | | | | | |
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 4 | 32 | 4 | | | | | | | 3 | 32 | 5 | | | | | | | 2 | 32 | 6 | | | | | | |
| Sum | | 40 | | | | | | | | | 40 | | | | | | | | | 40 | | | | | | | |
| Group | 7 | | | | | | | | | 8 | | | | | | | | | 9 | | | | | | | | |
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 4 | 32 | 4 | | | | | | | 3 | 32 | 5 | | | | | | | 2 | 32 | 6 | | | | | | |
| Sum | | 40 | | | | | | | | | 40 | | | | | | | | | 40 | | | | | | | |
| Group | 10 | | | | | | | | | 11 | | | | | | | | | 12 | | | | | | | | |
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 5 | 32 | 3 | | | | | | | 4 | 32 | 4 | | | | | | | 3 | 32 | 5 | | | | | | |
| Sum | | 40 | | | | | | | | | 40 | | | | | | | | | 40 | | | | | | | |
| Group | 13 | | | | | | | | | 14 | | | | | | | | | 15 | | | | | | | | |
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 5 | 32 | 3 | | | | | | | 4 | 32 | 4 | | | | | | | 3 | 32 | 5 | | | | | | |
| Sum | | 40 | | | | | | | | | 40 | | | | | | | | | 40 | | | | | | | |
| Group | 16 | | | | | | | | | 17 | | | | | | | | | 18 | | | | | | | | |
| Arrangement | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL | DSL | SSL | DSL |
| Number | 5 | 32 | 3 | | | | | | | 4 | 32 | 4 | | | | | | | 3 | 32 | 5 | | | | | | |
| Sum | | 40 | | | | | | | | | 40 | | | | | | | | | 40 | | | | | | | |

As shown in Table 1, five hundred and seventy-six touch signal lines SSL and one hundred and forty-four dummy signal lines DSL are divided into eighteen groups in the first direction D1, where each group includes thirty-two touch signal lines SSL and eight dummy signal lines DSL. In each of groups one, four, seven, eleven, fourteen, and seventeen, thirty-two touch signal lines SSL are disposed between four dummy signal lines DSL and the remaining four dummy signal lines DSL. In each of groups two, five, eight, ten, twelve, thirteen, fourteen, sixteen, and eighteen, thirty-two touch signal lines SSL are disposed between three dummy signal lines DSL and the remaining five dummy signal lines DSL. Additionally, In each of groups three, six, and nine, thirty-two touch signal lines SSL are disposed between two dummy signal lines DSL and the remaining six dummy signal lines DSL. FIG. 3 illustrates a top view of a portion of the touch electrodes 102, the dummy signal lines DSL, and the touch signal lines SSL according to Table 1. FIG. 3 only includes six touch electrodes 102 in the touch electrode columns $102C_1$-$102C_3$ of the $1^{st}$-$3^{rd}$ columns on the left and the touch electrode rows $102R_{j-1}$-$102R_j$ of the $(j-1)^{th}$-$j^{th}$ rows at the bottom of FIG. 1. As shown in FIG. 3, a gap is located between two adjacent touch electrodes 102, one of the dummy signal lines DSL located on one side of at least one group of the touch signal lines SSL and the dummy signal lines DSL is located in the gap and is not overlapped with the touch electrode 102, but this is not limited thereto.

For example, in FIG. 3, a dummy signal line DSL at the furthest right in the group one is disposed in a gap between two adjacent touch electrodes 102, and a dummy signal line DSL at the furthest right in the group two is disposed in another gap between two adjacent touch electrodes 102. In other embodiments, none of the dummy signal lines DSL is disposed in a gap between two adjacent touch electrodes 102, and each touch signal line SSL and each dummy signal line DSL in every group of the touch signal lines SSL and the dummy signal lines DSL can be overlapped with j touch electrodes 102 in the corresponding touch electrode column 102C. It is noteworthy that the number of touch signal lines SSL and the number of dummy signal lines DSL in each group of the touch signal lines SSL and the dummy signal lines DSL in this embodiment (which are respectively thirty-two and eight) are only an example, and not limited thereto. The numbers of the touch signal lines SSL and the dummy signal lines DSL disposed in each group are obtained according to the arrangement and the number of the touch electrodes and the resolution of the touch display device 10. This is detailed in the following paragraph.

As shown in FIG. 2, each of the touch electrodes 102 corresponds to a plurality of pixels PX, wherein the pixels PX are disposed in the display region DR in FIG. 1. In this embodiment, the resolution of the touch display device 10 is 720×1440, i.e. the pixels PX are arranged in 720 pixel columns and 1440 pixel rows. Since the touch electrodes 102 of this embodiment are arranged in eighteen touch electrode columns and thirty-two touch electrode rows, each of the touch electrodes 102 corresponds to a pixel matrix with 40×45 pixels. Additionally, each of the touch signal lines SSL and each of the dummy signal lines DSL respectively are disposed adjacent to a corresponding pixel column. In this embodiment, one touch signal line SSL or one dummy signal line DSL is disposed adjacent to one pixel column or disposed between two adjacent pixel columns, but is not limited thereto. In this embodiment, one pixel includes three sub-pixels (e.g., RGB sub-pixels) and one pixel column includes three sub-pixel columns, but is not limited thereto. As described above, the touch signal lines SSL and the dummy signal lines DSL of the touch display device 10 are divided into eighteen groups in the first direction D1, the number of touch signal lines SSL is thirty-two and the number of dummy signal lines DSL is eight in each group of the touch signal lines SSL and the dummy signal lines DSL, and each of the touch electrode columns corresponds to forty pixel columns in the first direction D1. Therefore, in a region corresponding to one touch electrode column, thirty-two touch signal lines SSL in a group of the touch signal lines SSL and the dummy signal lines DSL are respectively disposed adjacent to thirty-two of the forty pixel columns, and eight dummy signal lines DSL in the group of the touch signal lines SSL and the dummy signal lines DSL are respectively disposed adjacent to the remaining eight of the forty pixel columns. Accordingly, the pixels PX can have an identical aperture ratio to prevent regional differences in the visual effect of the touch display device 10. In addition, as shown in FIG. 3, the touch display device 10 not only includes the dummy signal lines DSL overlapped by the touch electrodes 102, but also includes the dummy signal lines DSL that are not overlapped by the touch electrodes 102 (ex. the dummy signal line DSL disposed between two adjacent touch electrodes 102). The shape and the size of the dummy signal lines DSL that are not overlapped by the touch electrodes 102 can be the same as other dummy signal lines DSL that are overlapped by the touch electrodes 102. The size of the dummy signal lines DSL can (for example) be the width in the first direction D1 and the height in the second direction D2. The shape of the dummy signal lines DSL can (for example) be the fashion or the angle of bending. In this embodiment, the width of the dummy signal lines DSL is substantially the same as the width of the touch signal lines SSL in the display region DR, and the aperture ratios of the pixels PX can be the same, but this is not limited thereto. As shown in FIG. 4, each pixel PX of this embodiment can be formed of three sub-pixels SP arranged along the first direction D1 in sequence, and the sub-pixels SP can be arranged in r number of columns and s number of rows, where r and s are positive integers greater than or equal to two. According to the number of pixels PX mentioned above, r=2160 (three times the number of columns of the pixels PX) and s=1440 in this embodiment. In other embodiments, each pixel PX can also be formed of one, two, or more than three of the sub-pixels SP. In addition, since the number of the touch electrode columns $102C_1$-$102C_i$ is i and the number of the touch electrode rows $102R_1$-$102R_j$ is j, the touch signal lines SSL and the dummy signal lines DSL can be divided into i number of groups in the first direction D1, and j number of touch signal lines SSL and k number of dummy signal lines DSL can be disposed in every group of the touch signal lines SSL and the dummy signal lines DSL, wherein k is equal to (r/(3i))-j. In one group of the touch signal lines SSL and the dummy signal lines DSL, j number of touch signal lines SSL are disposed between a portion of k number of dummy signal lines DSL and the remaining portion of k number of dummy signal lines DSL. For example, thirty-two touch signal lines SSL and eight dummy signal lines DSL are disposed in each group of the touch signal lines SSL and the dummy signal lines DSL when the touch electrodes 102 are arranged in eighteen columns and thirty-two rows and the resolution of the touch display device 10 is 720×1440. Additionally, thirty-two touch signal lines SSL are disposed between a portion of eight dummy signal lines DSL and the remaining portion of eight dummy signal lines DSL in each group of the touch signal lines SSL and the dummy signal lines DSL. In this embodiment, one touch signal line SSL or one dummy signal line DSL is disposed corresponding to every three columns of the sub-pixels SP (may be also called as three sub-pixel columns), the touch signal line SSL is disposed adjacent to one sub-pixel column or disposed between two adjacent sub-pixel columns, and the dummy signal line DSL can also be disposed adjacent to one sub-pixel column or disposed between two adjacent sub-pixel columns, but this is not limited thereto. It is noteworthy that the values of i, j, k, r, s, and the resolution of the present invention are not limited to the above description, and the values of i, j, k, r, s, and the resolution given above are only examples.

Figure 11:
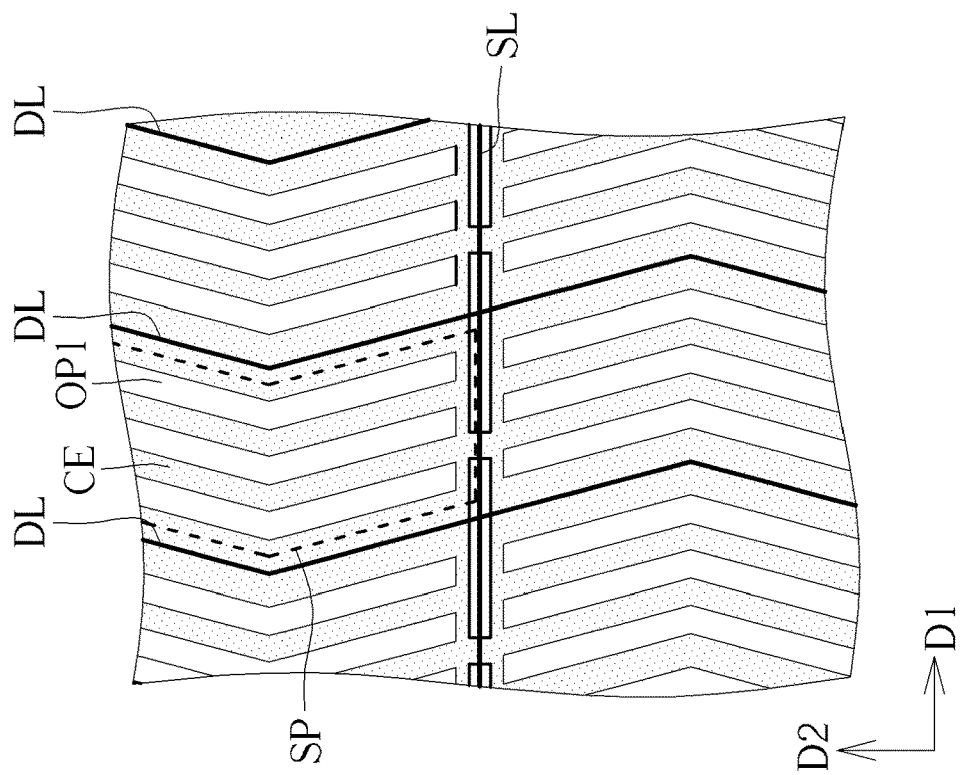
FIG. 11 is a schematic diagram illustrating a top view of a portion of the sub-pixels of the touch display device according to a second modification of the first embodiment of the present invention.
Figure 10:
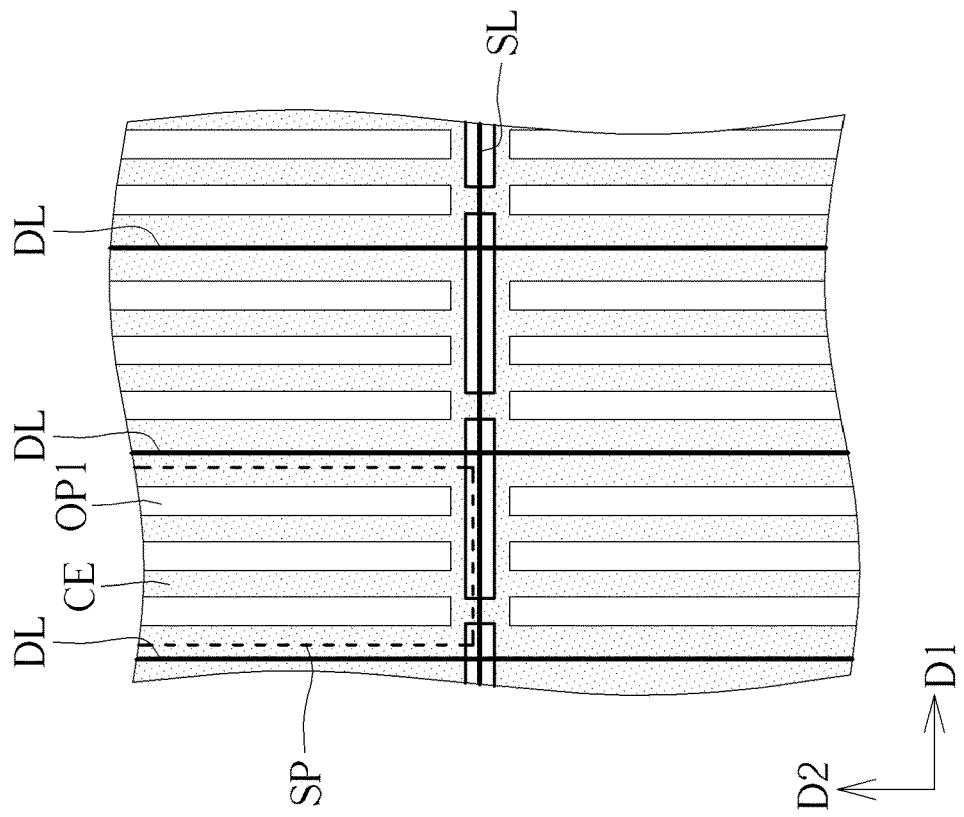
FIG. 10 is a schematic diagram illustrating a top view of a portion of the sub-pixels of the touch display device according to a first modification of the first embodiment of the present invention.

As shown in FIG. 4, the touch display device 10 includes a plurality of scan lines SL and a plurality of data lines DL in the display region DR. The scan lines SL extend in the first direction D1, and each scan line SL is disposed adjacent to one row of the sub-pixels SP. An extending direction of the data lines DL is not parallel to the first direction D1, the data lines DL substantially extend along the second direction D2, and the scan lines SL cross the data lines DL to define a plurality of sub-pixels SP. In this embodiment, the shape of a sub-pixel SP in the top view is similar to a parallelogram, but is not limited thereto. In this embodiment, the shape of a sub-pixel SP is similar to a parallelogram, the top edge and the bottom edge are parallel to the first direction D1, and the side edges are not parallel to the first direction D1 and the second direction D2. For example, in adjacent two sub-pixel rows $SPR_h$, $SPR_{h-1}$, the side edges of the parallelograms of the sub-pixels SP in the sub-pixel row $SPR_h$ and the second direction D2 have a positive included angle θ (ex. 7 degrees), and the side edges of the parallelograms of the sub-pixels SP in the sub-pixel row $SPR_{h-1}$ and the second direction D2 have a negative included angle −θ (ex. −7 degrees). The parallelogram shapes of the sub-pixels SP in the adjacent rows are not the same but are symmetrical to an imaginary line parallel to the first direction D1. Therefore, two adjacent sub-pixels SP in the second direction D2 form a shape "<" or ">", and the sub-pixels SP form a bending column in the second direction D2, but this is not limited thereto. FIG. 10 is a schematic diagram illustrating a top view of a portion of the sub-pixels according to a first modification of the first embodiment of the present invention. In this modification, the shape of the sub-pixels SP can be a rectangle. FIG. 11 is a schematic diagram illustrating a top view of a portion of the sub-pixels according to a second modification of the first embodiment of the present invention. In this modification, the shape of a sub-pixel SP can be "<" or ">", and the sub-pixels SP having ">" shape and the sub-pixels SP having "<" shape can be arranged alternately in the second direction D2.

In addition, as shown in FIG. 4, each of the touch signal lines SSL is disposed adjacent to one of the data lines DL, and each of the dummy signal lines DSL is also disposed adjacent to one of the data lines DL. In the display region DR, the data lines DL, the touch signal lines SSL, and the dummy signal lines DSL are substantially parallel to each other, and the data lines DL, the touch signal lines SSL, and the dummy signal lines DSL extend along the side edges of the parallelograms of the sub-pixels SP. Therefore, the data lines DL, the touch signal lines SSL, and the dummy signal lines DSL can have the bended structure in the display region DR in the second direction D2, but are not limited thereto. In addition, the touch signal lines SSL have a first width W1, and the data lines have a second width W2, where W1≥1.5*W2. For example, the first width W1 can be 7 micrometers and the second width W2 can be 4.5 micrometers in this embodiment. In this design, the resistance of the touch signal lines SSL can be reduced by increasing the width of the touch signal lines SSL, and the accuracy of touch sensing can thereby be enhanced.

As shown in FIG. 4, FIG. 5, and FIG. 6, the touch display device 10 includes a first metal layer 104, a second metal layer 106, a first transparent conductive layer 108, and a second transparent conductive layer 110. The first metal layer 104 is disposed on the substrate 100 and includes the scan lines SL. The second metal layer 106 is disposed on the first metal layer 104 and includes the data lines DL, the touch signal lines SSL, and the dummy signal lines DSL, but is not limited thereto. In a modification, the second metal layer 106 includes the data lines DL, a third metal layer includes the touch signal lines SSL and the dummy signal lines DSL, and the third metal layer is disposed on the second metal layer 106. Since at least one insulating layer is disposed between the second metal layer 106 and the third metal layer, the touch signal lines SSL and the dummy signal lines DSL in this modification may overlap the data lines DL in a vertical projection direction V to enhance the aperture ratio, but this is not limited thereto. The first transparent conductive layer 108 is disposed on the first metal layer 104 and the second metal layer 106 and includes a plurality of pixel electrodes PE (as shown in FIG. 5 and FIG. 6), and each of the pixel electrodes PE is disposed in one of the sub-pixels SP in the display region DR. The second transparent conductive layer 110 is disposed on the first transparent conductive layer 108 and includes the touch electrodes 102. Specifically, the second transparent conductive layer 110 includes a plurality of common electrodes CE, and each of the common electrodes CE is disposed in one of the sub-pixels SP. Each of the touch electrodes 102 is formed of the common electrodes CE of the corresponding sub-pixels SP, and these common electrodes CE are electrically connected to each other. Therefore, each touch electrode 102 can include plural common electrodes CE covering the corresponding sub-pixels SP. Additionally, the second transparent conductive layer 110 is disconnected between adjacent touch electrodes 102. In this embodiment, the touch electrode 1021 can further include a plurality of connecting portions 102C, wherein two ends of each of the connecting portions 102C are respectively connected to the common electrodes CE of two adjacent sub-pixel rows (ex. sub-pixel rows $SPR_h$, $SPR_{h+1}$), such that the common electrodes CE of different pixel rows can be electrically connected to each other. As shown in FIG. 4, the connecting portions 102C of this embodiment are disposed between two sub-pixel rows $SPR_h$, $SPR_{h+1}$ along a second scan line SL2 or the first direction D1, but this is not limited thereto. The common electrodes CE that form the touch electrodes 102 of this embodiment can include at least one first opening (which may also be referred to as a slit) OP1, the first openings OP1 overlap the pixel electrodes PE in the vertical projection direction V, and the fringe electric field can be produced between the common electrodes CE and the pixel electrodes PE to make the liquid crystal rotate due to the first openings OP1. Each of the common electrodes CE of this embodiment can include three first openings OP1, but the number of the first openings OP1 is not limited thereto. In addition, each of the touch electrodes 102 further includes a plurality of second openings OP2, each second opening OP2 is disposed corresponding to one touch signal line SSL, and each second opening OP2 partially overlaps the corresponding touch signal line SSL in the vertical projection direction V. Each second opening OP2 extends along the corresponding touch signal line SSL. Therefore, each second opening OP2 can overlap a portion of one of the touch signal lines SSL in the vertical projection direction V. The overlapping area of the touch electrodes 102 (or the common electrodes CE) and the touch signal lines SSL can be reduced to reduce the capacitive loading (C loading) between the touch electrodes 102 and the touch signal lines SSL, and an improved signal transmission effect can be achieved. Additionally, in this embodiment, each touch electrode 102 further includes a plurality of second openings OP2 disposed corresponding to the dummy signal lines DSL. Each of the second openings OP2 overlaps a portion of the dummy signal line DSL in the vertical projection direction V, but is not limited thereto. The size and the shape of the second openings OP2 disposed corresponding to the dummy signal lines DSL can be the same as that of the second openings OP2 disposed corresponding to the touch signal lines SSL, but this is not limited thereto. In a modification, the second openings OP2 can be disposed corresponding to the touch signal lines SSL only, and the second openings OP2 are not disposed corresponding to the dummy signal lines DSL.

As shown in FIG. 4, the scan lines SL include a first scan line SL1 and a second scan line SL2. The first scan line SL1 is disposed between two adjacent touch electrodes 1021, 1022 in the second direction D2. The touch electrode 1021 and the touch electrode 1022 are separated and electrically isolated from each other. In this embodiment, the first scan line SL1 is partially covered by an adjacent touch electrode 1021. For example, the touch electrode 1021 partially covering the first scan line SL1 includes a plurality of protruding portions 102P, the protruding portions 102P are disposed on an edge 102E of the touch electrode 1021 along the first scan line SL1 or the first direction D1, and each protruding portion 102P protrudes from the edge 102E to the first scan line SL1 in the second direction D2 to partially overlap the first scan line SL1. In addition, the second scan line SL2 is disposed between the sub-pixels SP covered by the corresponding touch electrode 102. For example, the second scan line SL2 may be substantially disposed between two adjacent sub-pixel rows $SPR_h$, $SPR_{h+1}$, and each connecting portion 102C extends in the second direction D2 to cover a portion of the second scan line SL2. Additionally, in this embodiment, the protruding portions 102P extend across the first scan line SL1, and the connecting portions 102C extend across the second scan line SL2. An area of a portion of the second scan line SL2 covered by the connecting portion 102C of one of the touch electrodes 102 (such as the touch electrode 1021) is substantially equal to an area of a portion of the first scan line SL1 covered by the protruding portion 102P of one of the touch electrodes 102. Accordingly, the overlapping area of the touch electrode 102 and the scan line SL at the edge (or the disconnection location) of the touch electrode 102 is substantially equal to the overlapping area of the touch electrode 102 and the scan line SL inside the touch electrode 102. The overlapping area of the first scan line SL1 and the touch electrode 102 is substantially equal to the overlapping area of the second scan line SL2 and the touch electrode 102, such that the difference between the C loading between the first scan line SL1 and the touch electrode 102 and the C loading between the second scan line SL2 and the touch electrode 102 can be reduced, and an improved signal transmission effect can be achieved.

In the display region DR of the touch display device 10, each sub-pixel SP includes a thin film transistor T. The structures of the thin film transistor T and the sub-pixel SP are detailed hereinafter. As shown in FIG. 4, FIG. 5, and FIG. 6, the thin film transistor T of this embodiment can be a bottom-gate thin film transistor, but it is not limited thereto. In other embodiments, the thin film transistor T can be a top-gate thin film transistor. In addition, the thin film transistor T can be a low temperature poly-silicon (LTPS) thin film transistor, an indium gallium zinc oxide (IGZO) thin film transistor, or an amorphous silicon thin film transistor, but it is not limited thereto. The thin film transistor T is disposed between the substrate 100 and the second transparent conductive layer 110. The thin film transistor T includes a gate G, a source S, a drain D, and a semiconductor layer CH. The first metal layer 104 further includes the gate G of the thin film transistor T, wherein each of the scan lines SL is electrically connected to a gate G of at least one thin film transistor T. Each scan line SL can provide on/off signals to the gates G for controlling the thin film transistors T and refreshing the display image. The second metal layer 106 further includes the source S and the drain D of the thin film transistor T, wherein each of the data lines DL is electrically connected to a source S of at least one thin film transistor T. Each data line DL can provide image gray level signals to the sources S of the thin film transistors T. The first metal layer 104 and the second metal layer 106 are formed of metallic materials and therefore have low resistances, and the decay of the signal during transmission can be reduced. The first metal layer 104 and the second metal layer 106 can be formed of the single metal layer or the multi-metal layers stacking together. The first metal layer 104 and the second metal layer 106 can be a single metal layer including aluminum, copper, titanium, or tungsten. The first metal layer 104 and the second metal layer 106 can also be a composite metal layer such as molybdenum/aluminum/molybdenum, titanium/aluminum/titanium, titanium/copper/titanium, or titanium/copper, but not limited thereto. A gate insulating layer GI is disposed on the gate G and covers the gate G, and the semiconductor layer CH is disposed between the gate insulating layer GI and the source S and disposed between the gate insulating layer GI and the drain D. The semiconductor layer CH may be amorphous silicon, polysilicon, or metal oxides (such as indium gallium zinc oxide). The first insulating layer 112 is disposed between the second metal layer 106 (such as the drain D) and the first transparent conductive layer 108 (such as the pixel electrode PE). The second insulating layer 114 is disposed between the first transparent conductive layer 108 (such as the pixel electrode PE) and the second transparent conductive layer 110 (such as the common electrode CE). The gate insulating layer GI, the first insulating layer 112, and the second insulating layer 114 can be silicon oxide, silicon nitride, or silicon oxynitride, but not limited thereto. The first transparent conductive layer 108 and the second transparent conductive layer 110 can be indium tin oxide (ITO), indium zinc oxide (IZO), or aluminum zinc oxide (AZO), but not limited thereto.

In this embodiment, the pixel electrode PE partially covers the drain D in the vertical projection direction V. The thin film transistor T includes a contact hole TH penetrating the second insulating layer 114 and the first insulating layer 112. The contact hole TH exposes a portion of the pixel electrode PE and a portion of the drain D. Additionally, the contact hole TH of this embodiment includes a first portion TH1 and a second portion TH2, wherein the first portion TH1 exposes a portion of the pixel electrode PE, the second portion TH2 exposes a portion of the drain D, and the first portion TH1 is disposed at a side of the second portion TH2, but it is not limited thereto. The second transparent conductive layer 110 of this embodiment further includes a connecting electrode 1101, and the connecting electrode 1101 is separated and electrically isolated from the common electrode CE. The connecting electrode 1101 covers the contact hole TH and extends into the contact hole TH, and the connecting electrode 1101 is in contact with and electrically connected to both the drain D of the thin film transistor T and the pixel electrode PE exposed by the contact hole TH. Therefore, the pixel electrode PE is electrically connected to the drain D of the thin film transistor T through the connecting electrode 1101. In this embodiment, a portion of the pixel electrode PE exposed by the contact hole TH has a third width W3, the contact hole TH has a diameter D (which may also be the length or width of the contact hole TH), and $$\frac{1}{3}D \leq W3 \leq \frac{1}{2}D.$$

For example, the diameter D of the contact hole TH can be 6 micrometers, and the third width W3 can be greater than or equal to 2 micrometers and less than or equal to 3 micrometers, but not limited thereto. According to the above relationship of the third width W3 and the diameter D, the connecting electrode 1101 of this embodiment is ensured to be electrically connected to the drain D and the pixel electrode PE, and the probability of electrically disconnection between the pixel electrode PE and the drain D of the thin film transistor T is reduced. According to the structure of the sub-pixel SP in this embodiment, the thickness of the first insulating layer 112 and the second insulating layer 114 may be adjusted to simultaneously optimize the capacitance of the storage capacitor and the loading between the data line DL and the common electrode CE. For example, the storage capacitance formed between the pixel electrode PE and the common electrode CE can be increased by reducing the thickness of the second insulating layer 114. Additionally, the loading between the data line DL and the common electrode CE and the probability of penetration of metallic materials can be reduced by increasing the thickness of the first insulating layer 112.

Figure 7C:
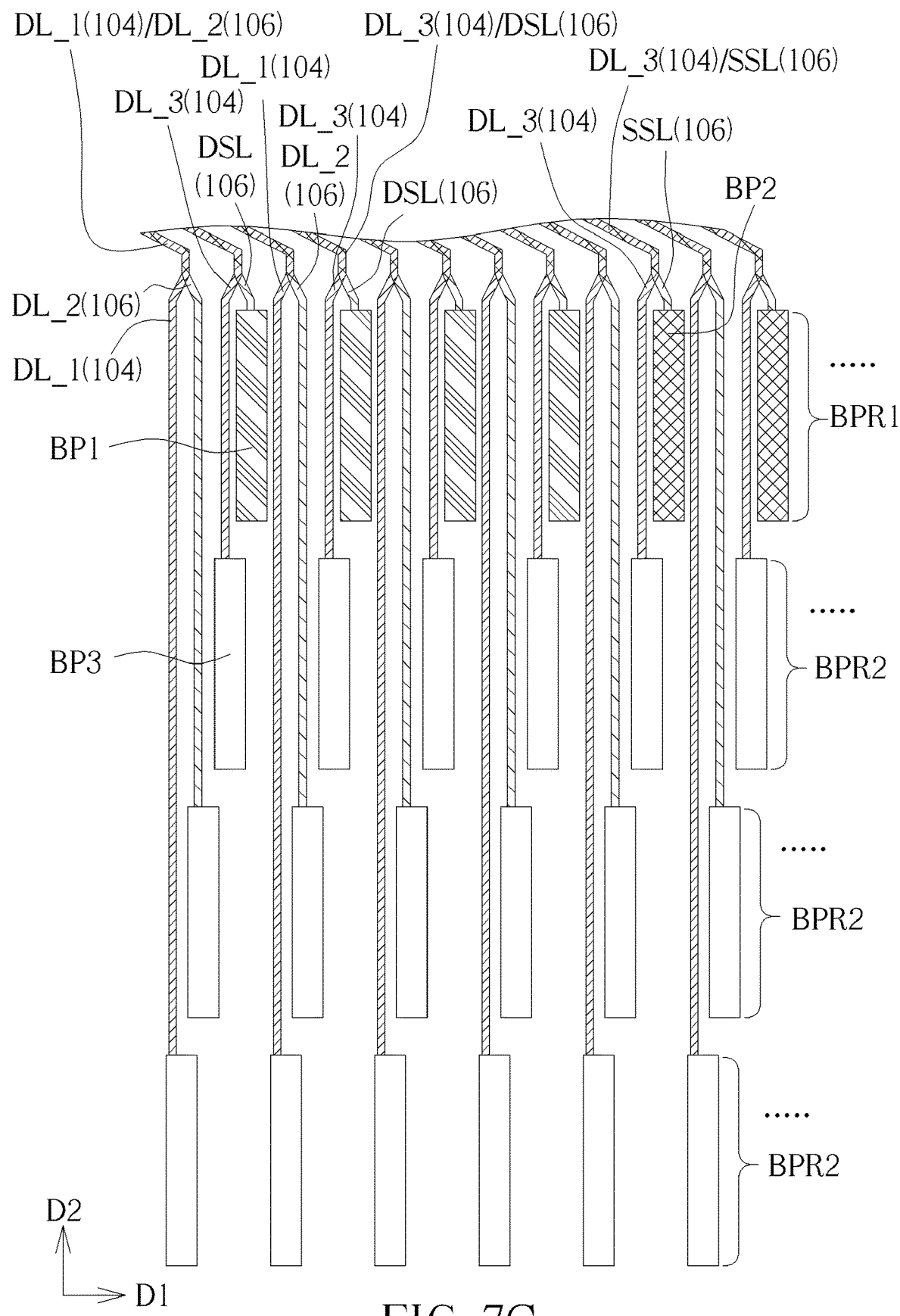
Figure 7D:
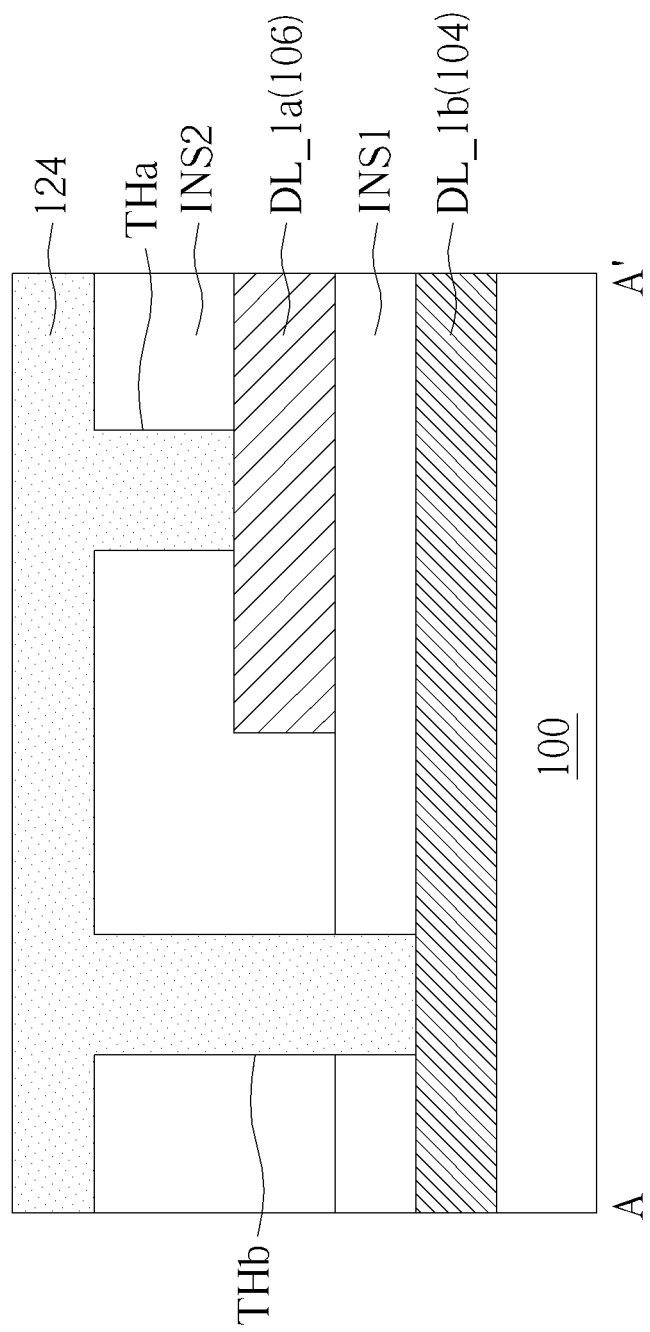

FIG. 7A and FIG. 7B are respectively schematic diagrams illustrating enlargements of a portion and another portion of a region A in FIG. 1, FIG. 7C is a schematic diagram illustrating an enlargement of a region B in FIG. 1, and FIG. 7D is a schematic diagram illustrating a cross-sectional diagram taken along line A-A' in FIG. 7A. The touch display device 10 of this embodiment includes an integrated circuit (IC) 116 and at least one gate driving circuit 118 disposed in the peripheral region PR and disposed on the substrate 100. The gate driving circuit 118 can be electrically connected to the IC 116, but is not limited thereto. In addition, the touch display device 10 further includes a plurality of first conductive connecting pads BP1, a plurality of second conductive connecting pads BP2, and a plurality of third conductive connecting pads BP3 disposed in the peripheral region PR and disposed on the substrate 100. The substrate 100 includes a bonding region 117 disposed in the peripheral region PR, and the IC 116, the first conductive connecting pads BP1, the second conductive connecting pads BP2, and the third conductive connecting pads BP3 are disposed in the bonding region 117.

The dummy signal lines DSL, the touch signal lines SSL, and the data lines DL extend from the display region DR to the bonding region 117 in the peripheral region PR. The dummy signal lines DSL are electrically connected to the first conductive connecting pads BP1, the touch signal lines SSL are electrically connected to the second conductive connecting pads BP2, and the data lines DL are electrically connected to the third conductive connecting pads BP3. It is noteworthy that FIG. 7C only shows the dummy signal lines DSL, the touch signal lines SSL, the data lines DL, the first conductive connecting pads BP1, the second conductive connecting pads BP2, and the third conductive connecting pads BP3 and omits the IC 116 in the bonding region 117.

In this embodiment, the IC 116 can include the source driving circuit and the touch sensing circuit, but is not limited thereto. The IC 116 can be disposed on the substrate 100 and the IC 116 can be a chip or system on glass (SOG), but is not limited thereto. In an embodiment wherein the IC 116 is a chip disposed on the substrate 100, the IC 116 includes a plurality of bonding pads, where at least a portion of the bonding pads are disposed corresponding to and electrically connected to the first conductive connecting pads BP1, the second conductive connecting pads BP2, and the third conductive connecting pads BP3.

In a modification, the IC 116 can be a chip, and the chip is disposed on the flexible or rigid circuit board which is electrically connected to the conductive connecting pads on the substrate 100, wherein the conductive connecting pads are electrically connected to the dummy signal lines DSL, the touch signal lines SSL, and the data lines DL.

In this embodiment, the gate driving circuit 118 is electrically connected to the IC 116. The IC 116 outputs the data signals to the data lines DL and the control signals to the gate driving circuit 118. The IC 116 also transmits and/or receives touch sensing signals, but is not limited thereto.

In a modification, the control signals of the gate driving circuit 118 can be provided by the other control chip, and/or the touch sensing signals are transmitted and/or received by the other touch sensing chip.

Additionally, in this embodiment, the gate driving circuit 118 is the gate driver on array (GOA) circuit structure, but is not limited thereto. In a modification, the gate driving circuit 118 can be a chip, and the chip is disposed on the substrate 100 or disposed on the flexible or rigid circuit board which is electrically connected to the conductive connecting pads on the substrate 100, and the conductive connecting pads can be electrically connected to the corresponding scan lines SL.

In addition, as shown in FIG. 1, the touch display device 10 of this embodiment includes two gate driving circuits 118 disposed out of the display region DR and by two sides of the display region DR in the first direction D1. That is, the display region DR can be disposed between two gate driving circuits 118, but is not limited thereto. The location and number of the gate driving circuit 118 can be adjusted according to the design. In other embodiments, the touch display device 10 can only include one gate driving circuit 118 disposed by a side of the display region DR. The gate driving circuit 118 can include a plurality of shift registers and a plurality of signal lines, but is not limited thereto.

In addition, each of the scan lines SL in the display region DR (as shown in FIG. 4) can be electrically connected to at least one of the gate driving circuits 118, and the gate driving circuits 118 can output the scan signals to the corresponding scan lines SL. In this embodiment, the gate driving circuits 118 can be electrically connected to the IC 116 through the conductive lines 120. Thus, the control signals (ex. start signals and/or clock signals) provided by the IC 116 can be transmitted to the gate driving circuits 118, and the gate driving circuits 118 can output scan signals to the corresponding scan lines SL in the display region DR. The touch signal lines SSL are electrically connected to the IC 116, and the IC 116 can transmit and/or receive touch sensing signals. Additionally, the dummy signal lines DSL and the data lines DL in FIG. 4 can also be electrically connected to the IC 116 in FIG. 1, and the IC 116 can transmit the image gray level signals to the data lines DL.

As shown in FIG. 7A and FIG. 7B, the arrangement of the dummy signal lines DSL, the touch signal lines SSL, and the data lines DL in the display region DR along the first direction D1 can sequentially be three data lines DL (including the data lines DL_1, DL_2, and DL_3 electrically connected to the sub-pixels SP corresponding to different colors), one touch signal line SSL (or one dummy signal line DSL), three data lines DL, one touch signal line SSL (or one dummy signal line DSL), and so on. The dummy signal lines DSL, the touch signal lines SSL, and the data lines DL in the display region DR are formed of the second metal layer 106.

In order to reduce the area of disposing the dummy signal lines DSL, the touch signal lines SSL, and the data lines DL in the peripheral region PR, two adjacent lines thereof may be respectively at least partially formed of the first metal layer 104 and the second metal layer 106 in the peripheral region PR, such that the two adjacent lines are at least partially overlapped with each other in the peripheral region PR.

For example, in the peripheral region PR, two adjacent data lines DL can be at least partially formed of the first metal layer 104 and the second metal layer 106, respectively, one and the other of adjacent dummy signal line DSL and data line DL can be at least partially formed of the first metal layer 104 and the second metal layer 106, respectively, and/or one and the other of adjacent touch signal line SSL and data line DL can be at least partially formed of the first metal layer 104 and the second metal layer 106, respectively.

Accordingly, one of the data lines DL at least partially overlaps an adjacent data line DL, one of the dummy signal lines DSL at least partially overlaps an adjacent data line DL and/or one of the touch signal lines SSL at least partially overlaps an adjacent data line DL in the peripheral region PR, and the area of disposing the dummy signal lines DSL, the touch signal lines SSL, and the data lines DL in the peripheral region PR can be reduced.

For example, as shown in FIG. 7A and FIG. 7B, the data line DL_1 includes a first portion DL_1a formed of the second metal layer 106 and a second portion DL_1b formed of the first metal layer 104. In this embodiment, the first portion DL_1a overlaps a portion of the second portion DL_1b (i.e. the first portion DL_1a overlaps the right half of the second portion DL_1b), and the structure including the first portion DL_1a and the portion of the second portion DL_1b is marked as DL_1b(104)/DL_1a(106) in FIG. 7A and FIG. 7B, but not limited thereto.

As shown in FIG. 7A, FIG. 7B and FIG. 7D, at least one first contact hole THa penetrates the insulating layer INS2, and at least one second contact hole THb penetrates the insulating layer INS1, INS2. The first contact hole THa exposes a portion of the first portion DL_1a, and the second contact hole THb exposes a portion of the second portion DL_1b. At least one bridge electrode 124 is disposed on the insulating layer INS2, and each bridge electrode 124 covers and extends into the corresponding first contact holes THa and the corresponding second contact holes THb to be in contact with the corresponding first portion DL_1a and the corresponding second portion DL_1b, therefore, the first portion DL_1a formed of the second metal layer 106 is electrically connected to the second portion DL_1b formed of the first metal layer 104 through the bridge electrode 124.

The bridge electrode 124 may be a portion of the second transparent conductive layer 110 or the first transparent conductive layer 108, the insulating layer INS1 may include a portion of the gate insulating layer GI, and the insulating layer INS2 may include a portion of at least one of the first insulating layer 112 and the second insulating layer 114, but not limited thereto.

In the embodiment where the bridge electrode 124 is a portion of the second transparent conductive layer 110 or the first transparent conductive layer 108, the bridge electrode 124 is separated and electrically isolated from the pixel electrodes PE and the common electrodes CE.

In a modification, the bridge electrode 124 may be at least a portion of a conductive layer different from the second transparent conductive layer 110 and the first transparent conductive layer 108. As shown in FIG. 7A, FIG. 7B and FIG. 7D, the bridge electrode 124 fills the first contact holes THa and is in contact with the first portions DL_1a exposed by the first contact holes THa, and the bridge electrode 124 also fills the second contact holes THb and is in contact with the second portions DL_1b exposed by the second contact holes THb. The data line DL_1 is changed from the second metal layer 106 to the first metal layer 104 through the first contact holes THa, the second contact holes THb, and the bridge electrode 124, and the adjacent data line DL_2 is still formed of the second metal layer 106. Therefore, the adjacent data lines DL_1, DL_2 can at least partially overlap each other in the peripheral region PR and the overlapped portion is marked as DL_1(104)/DL_2 (106) in FIG. 7A, FIG. 7B and FIG. 7C.

The structure including the first contact holes THa, the second contact holes THb, and the bridge electrode 124 may be called as a metal layer transferring structure electrically connecting the first metal layer 104 and the second metal layer 106. The structure of the metal layer transferring structure is not limited to the above-described embodiments.

Figure 8A:
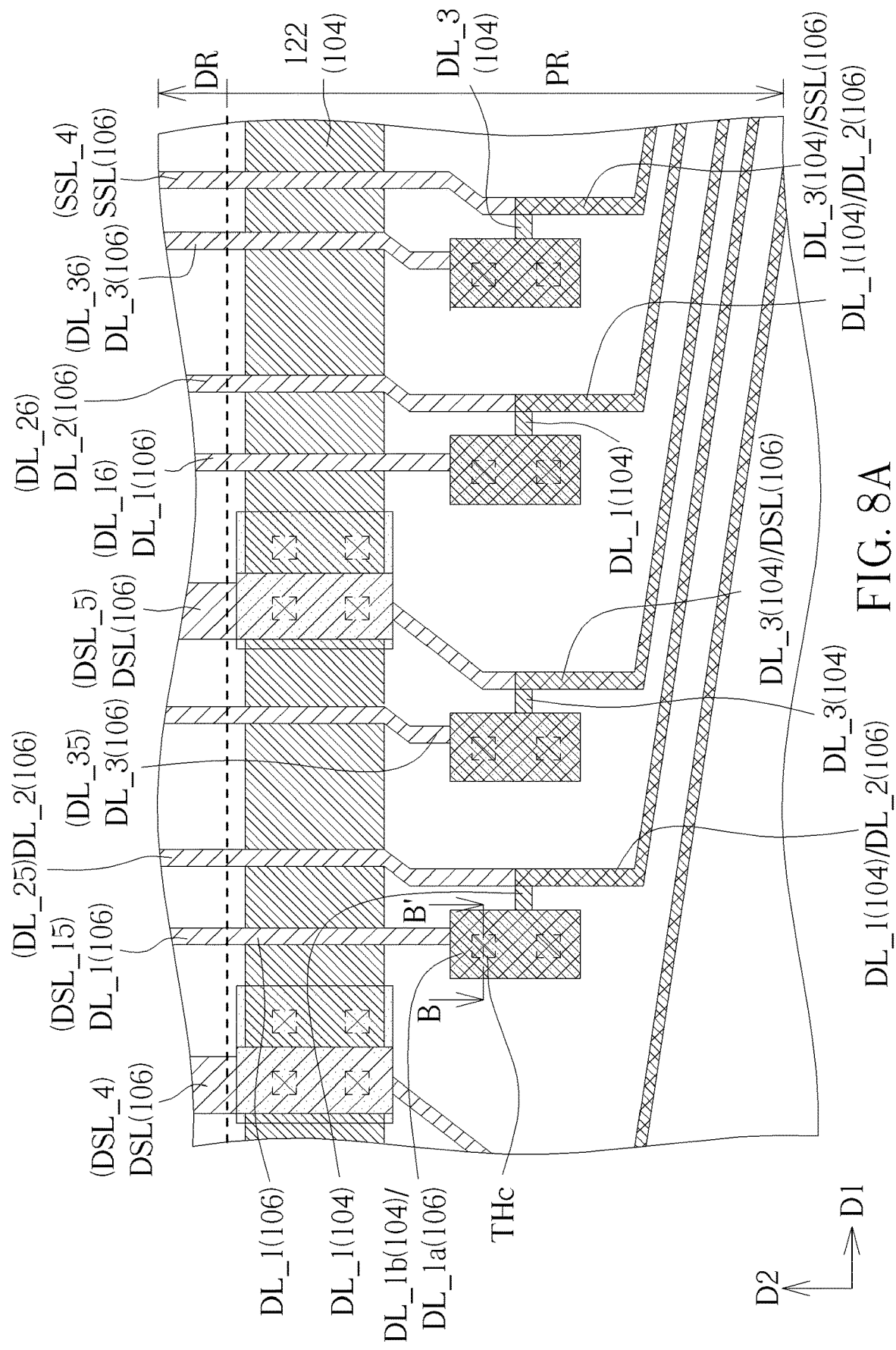
FIG. 8A and FIG. 8B are schematic diagrams illustrating the configuration of data lines, touch signal lines and dummy signal lines and a cross-sectional view of a metal layer transferring structure of a touch display device according to a variant embodiment of the present invention.
Figure 8B:
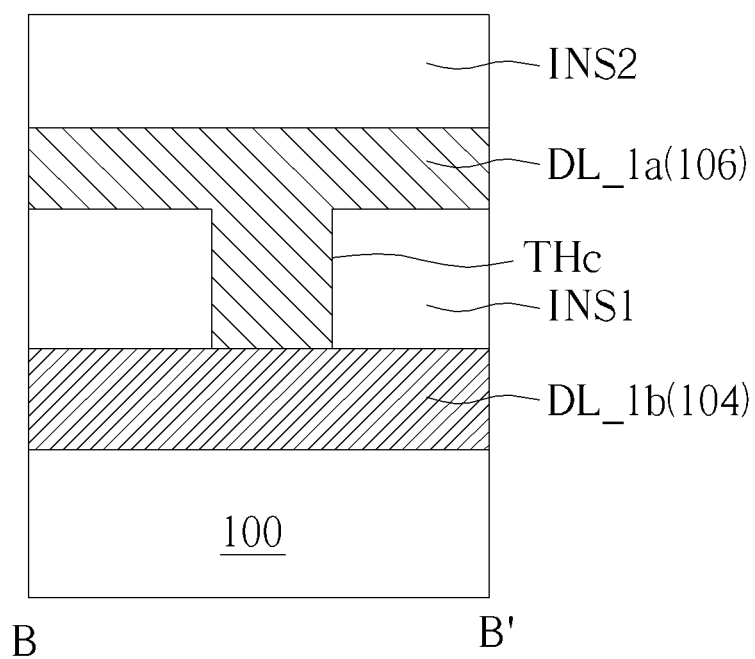

FIG. 8A is a schematic diagram illustrating an enlargement of a portion of a region A in FIG. 1 according to a variant embodiment, and FIG. 8B is a schematic diagram illustrating a cross-sectional diagram taken along line B-B' in FIG. 8A. It is noted that FIG. 8A is similar to FIG. 7A, and the difference is that the metal layer transferring structures in FIG. 8A is different from that in FIG. 7A. In the variant embodiment, the first portion DL_1a and the second portion DL_1b are at least partially overlapped, at least one insulating layer INS1 is disposed between the first portion DL_1a and the second portion DL_1b, and the at least one insulating layer INS1 includes at least one contact hole THc exposing a portion of the second portion DL_1b. The first portion DL_1a covers the corresponding contact hole THc, and fills the contact hole THc and is in contact with the second portions DL_1b exposed by the contact hole THc. Therefore, the data line DL_1 is changed from the second metal layer 106 to the first metal layer 104 through the at least one contact hole THc of the at least one insulating layer INS1 between the first portion DL_1a and the second portion DL_1b.

Referring to FIGS. 7A-7C, the overlapped data lines DL_1, DL_2 can extend to the region near the first conductive connecting pads BP1 or the second conductive connecting pads BP2 and then separate (i.e. not overlap) and extend to the corresponding third conductive connecting pads BP3. Similarly, the data line DL_3 is changed from the second metal layer 106 to the first metal layer 104 through the metal layer transferring structure, and the adjacent dummy signal line DSL (or the touch signal line SSL) is still formed of the second metal layer 106. Therefore, the adjacent data line DL_3 and the dummy signal line DSL (or the touch signal line SSL) can overlap each other, and the overlapped portion is marked as DL_3(104)/DSL(106) or DL_3(104)/SSL(106) in FIG. 7A and FIG. 7B.

The overlapped data line DL_3 and the dummy signal line DSL (or the touch signal line SSL) can extend to the region near the first conductive connecting pads BP1 or the second conductive connecting pads BP2 and then separate (i.e. not overlap) and extend to the corresponding third conductive connecting pad BP3 and the corresponding first conductive connecting pad BP1 (or the corresponding second conductive connecting pad BP2). In the above embodiment, the dummy signal lines DSL, the touch signal lines SSL, and a portion of the data lines DL (e.g. DL_2) are formed of the second metal layer 106 in the display region DR and the peripheral region PR. The rest of the data lines DL (e.g. DL_1 and DL_3) are changed from the second metal layer 106 to the first metal layer 104 by the metal layer transferring structures in the peripheral region PR, but this is not limited thereto.

In a variant embodiment, the arrangement of the dummy signal lines DSL, the touch signal lines SSL, and the data lines DL in the display region DR is the same as FIG. 7A or FIG. 7B, and the difference is that in this variant embodiment, the dummy signal lines DSL, the touch signal lines SSL, and a portion of the data lines DL (e.g. DL_2) are changed from the second metal layer 106 to the first metal layer 104 by the metal layer transferring structures in the peripheral region PR, and the rest of the data lines DL (e.g.

DL_1 and DL_3) are formed of the second metal layer 106 in the display region DR and the peripheral region PR.

In this variant embodiment, the dummy signal lines DSL, the touch signal lines SSL, and the data lines DL are formed of the second metal layer 106 in the display region DR, and the dummy signal lines DSL, the touch signal lines SSL, and a portion of the data lines DL are changed from the second metal layer 106 to the first metal layer 104 by the metal layer transferring structures in the peripheral region PR. Therefore, one of the data lines DL partially overlaps an adjacent data line DL in the peripheral region PR, one of the dummy signal lines DSL partially overlaps an adjacent data line DL and/or one of the touch signal lines SSL partially overlaps an adjacent data line DL in the peripheral region PR.

It is noted that in the FIG. 7A, FIG. 7B and the variant embodiment, the data line DL_1 is at least partially overlapped with the data line DL_2 which is located at the right side thereof in the peripheral region PR, and the data line DL_3 is at least partially overlapped with the touch signal line SSL or the dummy signal line DSL which is adjacent thereto (e.g. the touch signal line SSL or the dummy signal line DSL which is located at the right side of the data line DL_3) in the peripheral region PR, but this is not limited thereto.

Figure 9:
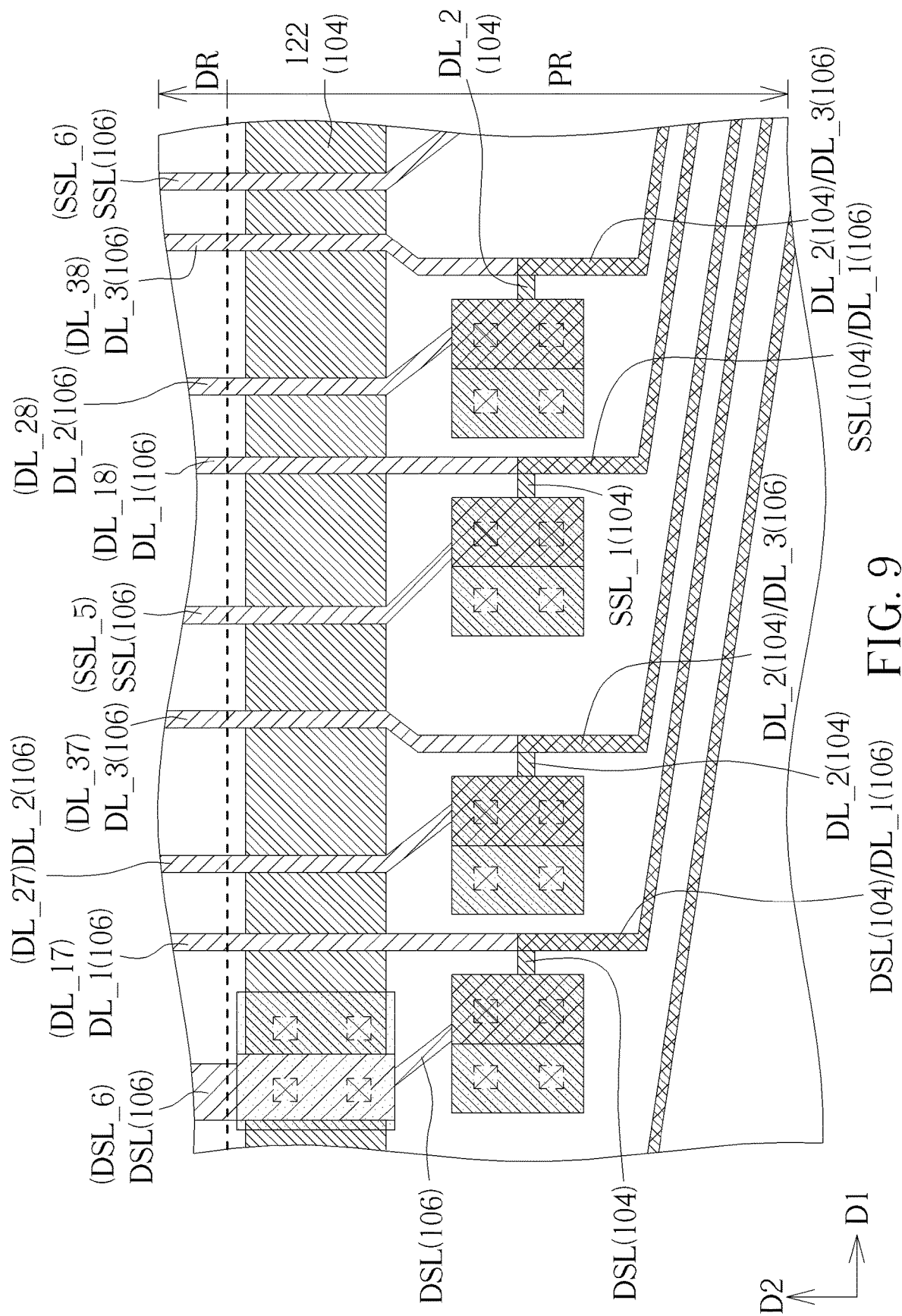
FIG. 9 is a schematic diagram illustrating the configuration of data lines, touch signal lines and dummy signal lines of a touch display device according to another variant embodiment of the present invention.

FIG. 9 is a schematic diagram illustrating an enlargement of a portion of a region A in FIG. 1 according to another variant embodiment. In the another variant embodiment, the data line DL_1 is at least partially overlapped with the touch signal line SSL or the dummy signal line DSL which is adjacent thereto (e.g. the touch signal line SSL or the dummy signal line DSL which is located at the left side of the data line DL_1) in the peripheral region PR, and the data line DL_3 is at least partially overlapped with the data line DL_2 which is located at the left side thereof in the peripheral region PR.

In the another variant embodiment, the dummy signal lines DSL, the touch signal lines SSL, and a portion of the data lines DL (e.g. DL_2) are changed from the second metal layer 106 to the first metal layer 104 by the metal layer transferring structures in the peripheral region PR, and the rest of the data lines DL (e.g. DL_1 and DL_3) are formed of the second metal layer 106 in the display region DR and the peripheral region PR, but not limited thereto.

In a modification, the dummy signal lines DSL, the touch signal lines SSL, and a portion of the data lines DL (e.g. DL_2) are formed of the second metal layer 106 in the display region DR and the peripheral region PR, and the rest of the data lines DL (e.g. DL_1 and DL_3) are changed from the second metal layer 106 to the first metal layer 104 by the metal layer transferring structures in the peripheral region PR. The metal layer transferring structure in FIG. 9 is similar to that in FIG. 7A and FIG. 7B, therefore, the details will not be repeated herein.

In another modification, the metal layer transferring structure in FIG. 9 may be replaced by a metal layer transferring structure similar to that in FIG. 8A.

Note that in order to illustrate more clearly the arrangement of the data lines DL_1, DL_2, DL_3, the dummy signal lines DSL and the touch signal lines SSL in FIG. 7A, FIG. 7B, FIG. 8A and FIG. 9, the dummy signal lines DSL_1, DSL_2, DSL_3, DSL_4, DSL_5, DSL_6, the touch signal lines SSL_1, SSL_2, SSL_3, SSL_4, SSL_5, SSL_6, the data lines DL_11, DL_12, DL_13, DL_14, DL_15, DL_16, DL_17, DL_18, the data lines DL_21, DL_22, DL_23, DL_24, DL_25, DL_26, DL_27, DL_28 and the data lines DL_31, DL_32, DL_33, DL_34, DL_35, DL_36, DL_37, DL_38 are marked in FIG. 7A, FIG. 7B, FIG. 8A and FIG. 9. In FIG. 7A, FIG. 7B, FIG. 8A and FIG. 9, the dummy signal lines DSL are electrically connected to the electric potential line 122 through the metal layer transferring structures, but is not limited thereto. In addition, in a modification, any one of the dummy signal lines DSL_1, DSL_2, DSL_3, DSL_4, DSL_5, DSL_6 in FIG. 7A, FIG. 7B, FIG. 8A and FIG. 9 may be replaced by a touch signal line SSL which is not connected to the electric potential line 122, and/or any one of the touch signal lines SSL_1, SSL_2, SSL_3, SSL_4, SSL_5, SSL_6 in FIG. 7A, FIG. 7B, FIG. 8A and FIG. 9 may be replaced by a dummy signal line DSL, and details that are similar to those described previously in the embodiments of FIG. 7A, FIG. 7B, FIG. 8A and FIG. 9 will not be repeated herein. For example, the dummy signal line DSL_3 in FIG. 7A may be replaced by a touch signal line SSL. In FIG. 9, the dummy signal line DSL_6 may be replaced by a touch signal line SSL, and the touch signal line SSL is at least partially overlapped with the data line DL_17 in the peripheral region PR. In FIG. 7B, the touch signal line SSL_3 may be replaced by a dummy signal line, and the dummy signal line which replaces the touch signal line SSL_3 is at least partially overlapped with the data line DL_34 in the peripheral region PR. In FIG. 7B, the dummy signal line DSL_3 may be replaced by a touch signal line. In FIG. 9, the dummy signal line DSL_6 may be replaced by a touch signal line, and the touch signal line which replaces the dummy signal line DSL_6 is at least partially overlapped with the data line DL_17 in the peripheral region PR.

It is noted that the first metal layer 104 is disposed below the second metal layer 106 in FIG. 5, FIG. 7D and FIG. 8B, but not limited thereto. In another embodiment, the first metal layer 104 is disposed above the second metal layer 106. For example, in a touch display device including a top-gate thin film transistor, the first metal layer 104 including the scan line SL and the gate G of the thin film transistor T is disposed above the second metal layer 106 including the source S and the drain D of the thin film transistor T and the data line DL.

In addition, in a variant embodiment, the first metal layer 104 may not include the scan line SL and the gate G of the thin film transistor T, in other words, the scan line SL, the gate G of the thin film transistor T may be formed of a metal layer different from the first metal layer 104 in FIGS. 7A-7D, FIGS. 8A-8B and FIG. 9.

In the present invention, the first metal layer 104 may be disposed below or above the second metal layer 106 in the overlapped portions DL_1b(104)/DL_1a(106), DL_1(104)/DL_2(106), DL_3(104)/DSL(106), DL_3(104)/SSL(106), DSL(104)/DL_1(106), DL_2 (104)/DL_3 (106), SSL (104)/DL_1(106) in FIGS. 7A-7C, FIG. 8A and FIG. 9 in the present invention.

To summarize, in the present invention, a touch display device comprises a plurality of data lines and a plurality of touch signal lines disposed on a substrate, a first data line, a second data line and a third data line of the plurality of data lines are located between a first touch signal line and a second touch signal line of the plurality of touch signal lines in the display region, and in the peripheral region, one of the first and the second touch signal lines is at least partially overlapped with one of the first to the third data lines, and the others of the first to the third data lines are at least partially overlapped with each other; in the display region, the first data line may be adjacent to and located between the first touch signal line and the second data line, and the third data line may be adjacent to and located between the second data line and the second touch signal line, and in the peripheral region, the third data line may be at least partially overlapped with the second touch signal line, and the first data line may be at least partially overlapped with the second data line. For example, in FIG. 7B, the touch signal lines SSL_2, SSL_3 may be respectively called as the first and the second touch signal lines, and the data lines DL_14, DL_24, DL_34 may be respectively called as the first, the second and the third data lines; in FIG. 9, the touch signal lines SSL_6, SSL_5 may be respectively called as the first and the second touch signal lines, and the data lines DL_38, DL_28, DL_18 may be respectively called as the first, the second and the third data lines. In the peripheral region, at least a portion of the first data line and at least a portion of the third data line may be formed of a first metal layer, the second data line and the second touch signal line may be formed of a second metal layer, and in the display region, the first data line, the second data line, the third data line, the first touch signal line and the second touch signal line may be formed of the second metal layer; each of the first data line and the third data line may comprise a first portion and a second portion, the first portion and the second portion of the first data line and the first portion and the second portion of the third data line may be located in the peripheral region, the first portion of the first data line and the first portion of the third data line may be formed of the second metal layer, the second portion of the first data line and the second portion of the third data line may be formed of the first metal layer, at least a portion of the second portion of the first data line may be overlapped with a portion of the second data line, and at least a portion of the second portion of the third data line may be overlapped with a portion of the second touch signal line, but the present invention is not limited thereto. In a modification, in the peripheral region, at least a portion of the second data line and at least a portion of the second touch signal line may be formed of a first metal layer, the first data line and the third data line may be formed of a second metal layer, and in the display region, the first data line, the second data line, the third data line, the first touch signal line and the second touch signal line may be formed of the second metal layer; each of the second data line and the second touch signal line may comprise a first portion and a second portion, the first portion and the second portion of the second data line and the first portion and the second portion of the second touch signal line may be located in the peripheral region, the first portion of the second data line and the first portion of the second touch signal line may be formed of the second metal layer, the second portion of the second data line and the second portion of the second touch signal line may be formed of the first metal layer, at least a portion of the second portion of the second data line may be overlapped with a portion of the first data line, and at least a portion of the second portion of the second touch signal line may be overlapped with a portion of the third data line, but the present invention is not limited thereto. The touch display device may further comprise at least one dummy signal line and/or the plurality of touch signal lines may further comprise a third touch signal line. In the embodiment where the touch display device further comprises at least one dummy signal line, the touch display device may further comprise a first dummy signal line disposed on the substrate, the plurality of data lines may further comprise a fourth data line, a fifth data line and a sixth data line, and the fourth data line, the fifth data line and the sixth data line may be located between the second touch signal line and the first dummy signal line in the display region; in the display region, the fourth data line may be adjacent to and located between the second touch signal line and the fifth data line, the sixth data line may be adjacent to and located between the fifth data line and the first dummy signal line, and in the peripheral region, the sixth data line may be at least partially overlapped with the first dummy signal line, and the fourth data line may be at least partially overlapped with the fifth data line. For example, in FIG. 9, the dummy signal line DSL_6 may be called as the first dummy signal line, and the data lines DL_37, DL_27, DL_17 may be respectively called as the fourth, the fifth and the sixth data lines. As described above, any one of the dummy signal lines DSL_1, DSL_2, DSL_3, DSL_4, DSL_5, DSL_6 in FIG. 7A, FIG. 7B, FIG. 8A and FIG. 9 may be replaced by a touch signal line SSL, and/or any one of the touch signal lines SSL_1, SSL_2, SSL_3, SSL_4, SSL_5, SSL_6 in FIG. 7A, FIG. 7B, FIG. 8A and FIG. 9 may be replaced by a dummy signal line DSL, therefore, in FIG. 7B, if the dummy signal line DSL_3 is replaced by a touch signal line and the touch signal line SSL_3 is replaced by a dummy signal line which is also called as the first dummy signal line, the touch signal line which replaces the dummy signal line DSL_3 and the touch signal line SSL_2 may be respectively called as the first and the second touch signal lines, and the data lines DL_13, DL_23, DL_33, DL_14, DL_24, DL_34 may be respectively called as the first, the second, the third, the forth, the fifth and the sixth data lines. In the peripheral region, at least a portion of the first data line, at least a portion of the third data line, at least a portion of the fourth data line and at least a portion of the sixth data line may be formed of a first metal layer, the second data line, the second touch signal line, the fifth data line and the first dummy signal line may be formed of a second metal layer, and in the display region, the first data line, the second data line, the third data line, the fourth data line, the fifth data line, the sixth data line, the first touch signal line, the second touch signal line and the first dummy signal line may be formed of the second metal layer, but the present invention is not limited thereto. In a modification, in the peripheral region, at least a portion of the second data line, at least a portion of the second touch signal line, at least a portion of the fifth data line and at least a portion of the first dummy signal line may be formed of a first metal layer, the first data line, the third data line, the fourth data line and the sixth data line are formed of a second metal layer, and in the display region, the first data line, the second data line, the third data line, the fourth data line, the fifth data line, the sixth data line, the first touch signal line, the second touch signal line and the first dummy signal line may be formed of the second metal layer. In the embodiment where the plurality of touch signal lines further comprise a third touch signal line, the plurality of data lines may further comprise a fourth data line, a fifth data line and a sixth data line, and the fourth data line, the fifth data line and the sixth data line may be located between the first touch signal line and the third touch signal line in the display region; in the display region, the fourth data line may be adjacent to and located between the third touch signal line and the fifth data line, the sixth data line may be adjacent to and located between the fifth data line and the first touch signal line, and in the peripheral region, the sixth data line may be at least partially overlapped with the first touch signal line, and the fourth data line may be at least partially overlapped with the fifth data line. For example, in FIG. 7B, if the dummy signal line DSL_3 is replaced by a touch signal line which is also called as the third touch signal line, the data lines DL_13, DL_23, DL_33 may be respectively called as the fourth, the fifth and the sixth data lines; in FIG. 9, if the dummy signal line DSL_6 is replaced by a touch signal line, the touch signal line SSL_5, the touch signal line which replaces the dummy signal line DSL_6 and the touch signal line SSL_6 may be respectively called as the first, the second and the third touch signal lines, and the data lines DL_37, DL_27, DL_17, DL_38, DL_28, DL_18 may be respectively called as the first, the second, the third, the forth, the fifth and the sixth data lines. In the peripheral region, at least a portion of the first data line, at least a portion of the third data line, at least a portion of the fourth data line and at least a portion of the sixth data line may be formed of a first metal layer, the second data line, the second touch signal line, the fifth data line and the first touch signal line may be formed of a second metal layer, and in the display region, the first data line, the second data line, the third data line, the fourth data line, the fifth data line, the sixth data line, the first touch signal line, the second touch signal line and the third touch signal line may be formed of the second metal layer, but the present invention is not limited thereto. In a modification, in the peripheral region, at least a portion of the second data line, at least a portion of the second touch signal line, at least a portion of the fifth data line and at least a portion of the first touch signal line may be formed of a first metal layer, the first data line, the third data line, the fourth data line and the sixth data line may be formed of a second metal layer, and in the display region, the first data line, the second data line, the third data line, the fourth data line, the fifth data line, the sixth data line, the first touch signal line, the second touch signal line and the third touch signal line may be formed of the second metal layer.

In addition, the order and arrangement of the first conductive connecting pads BP1, the second conductive connecting pads BP2, and the third conductive connecting pads BP3 are determined by the order and arrangement of the bonding pads in the IC 116. In the prior art, the dummy signal lines are randomly interposed among the touch signal lines, and each of at least one of the dummy signal lines and each of at least one of the touch signal lines need to cross at least three data lines in the first direction D1 to electrically connect the corresponding conductive connecting pads in the peripheral region PR. Accordingly, in order to avoid shorting between the data line and the dummy signal line (or the touch signal line) crossing each other, the at least three data lines crossing the dummy signal line (or the touch signal line) are formed of a metal layer different from that of the dummy signal line (or the touch signal line) in the peripheral region PR, therefore any two adjacent ones of the at least three data lines cannot be overlapped with each other, or the dummy signal line or the touch signal line needs to adopt a plurality of metal layer transferring structures to cross the at least three data lines in the peripheral region PR, thus the area of disposing these conductive lines cannot be effectively reduced. According to the unique arrangement of the dummy signal lines DSL and the touch signal lines SSL in the present invention (e.g. the embodiment of Table 1), each of the dummy signal lines DSL and each of the touch signal lines SSL of this embodiment do not need to cross data lines DL in the peripheral region PR to electrically connect the corresponding first conductive connecting pad BP1 and the corresponding second conductive connecting pad BP2. Therefore, two of the adjacent data lines DL can be formed of different metal layers and overlap each other, the dummy signal line DSL and the adjacent data line DL can be formed of different metal layers and overlap each other, and/or the touch signal line SSL and the adjacent data line DL can be formed of different metal layers and overlap each other in the peripheral region PR, and the area of disposing the dummy signal lines DSL, the touch signal lines SSL, and the data lines DL in the peripheral region PR can be reduced. In this embodiment, one touch signal line SSL or one dummy signal line DSL is disposed corresponding to every three data lines DL, and therefore the number of third conductive connecting pads BP3 is three times the sum of the number of first conductive connecting pads BP1 and the number of second conductive connecting pads BP2, but not limited thereto. The first conductive connecting pads BP1 and the second conductive connecting pads BP2 can be arranged to form a first conductive connecting pad row BPR1 along the first direction D1, and the third conductive connecting pads BP3 can be arranged to form at least one second conductive connecting pad row BPR2 along the first direction D1. In this embodiment, the first conductive connecting pad row BPR1 is parallel to the second conductive connecting pad rows BPR2, but is not limited thereto. Additionally, the first conductive connecting pad row BPR1 can be disposed between the second conductive connecting pad rows BPR2 and the display region DR, but is not limited thereto. In a modification, the second conductive connecting pads BP2 can be disposed between the first conductive connecting pad row BPR1 and the display region DR. Additionally, in FIG. 7C, the first conductive connecting pads BP1 and the second conductive connecting pads BP2 in the first conductive connecting pad row BPR1 partially overlap the third conductive connecting pads BP3 in the adjacent second conductive connecting pad row BPR2 in the second direction D2, and the third conductive connecting pads BP3 in two adjacent second conductive connecting pad rows BPR2 partially overlap each other in the second direction D2, but this is not limited thereto. In a modification, the conductive connecting pads in two adjacent conductive connecting pad rows are staggered and not overlapped in the second direction D2. In addition, the dummy signal lines DSL of the present invention are not electrically connected to the touch electrodes 102. The first conductive connecting pads BP1 electrically connected to the dummy signal lines DSL can be floating, but this is not limited thereto. In other embodiments, the IC 116 or other chips can provide a fixed electric potential to the first conductive connecting pads BP1, thus the dummy signal lines DSL can have the fixed electric potential and the visual effect of the touch display device 10 is prevented from being affected by noise coupling of the floating dummy signal lines DSL. For example, the IC 116 or other chips can provide a common voltage to the first conductive connecting pads BP1, and the electric potential of the dummy signal lines DSL can be equivalent to the common voltage.

Referring to FIG. 1, the touch display device 10 in this embodiment further includes an electric potential line 122 disposed in the peripheral region PR and on the substrate 100. The electric potential line 122 of this embodiment includes a ring structure disposed between the display region DR and the gate driving circuits 118 and between the display region DR and the bonding area 117, where the electric potential line 122 can surround the display region DR, but is not limited thereto. In other embodiments, the electric potential line 122 can have different designs according to different requirements. As shown in FIG. 1, the electric potential line 122 of this embodiment includes a closed rectangle ring structure, but is not limited thereto. For example, the shape of the ring structure may be a rectangle, a polygon, an irregular shape or other shapes. The ring structure can be a closed structure, wherein two ends of the electric potential line 122 connect with each other. The ring structure can also be a non-closed structure, wherein two ends of the electric potential line 122 do not connect with each other. In some embodiments, the structure of the electric potential line 122 may not be the ring structure.

Figure 12:
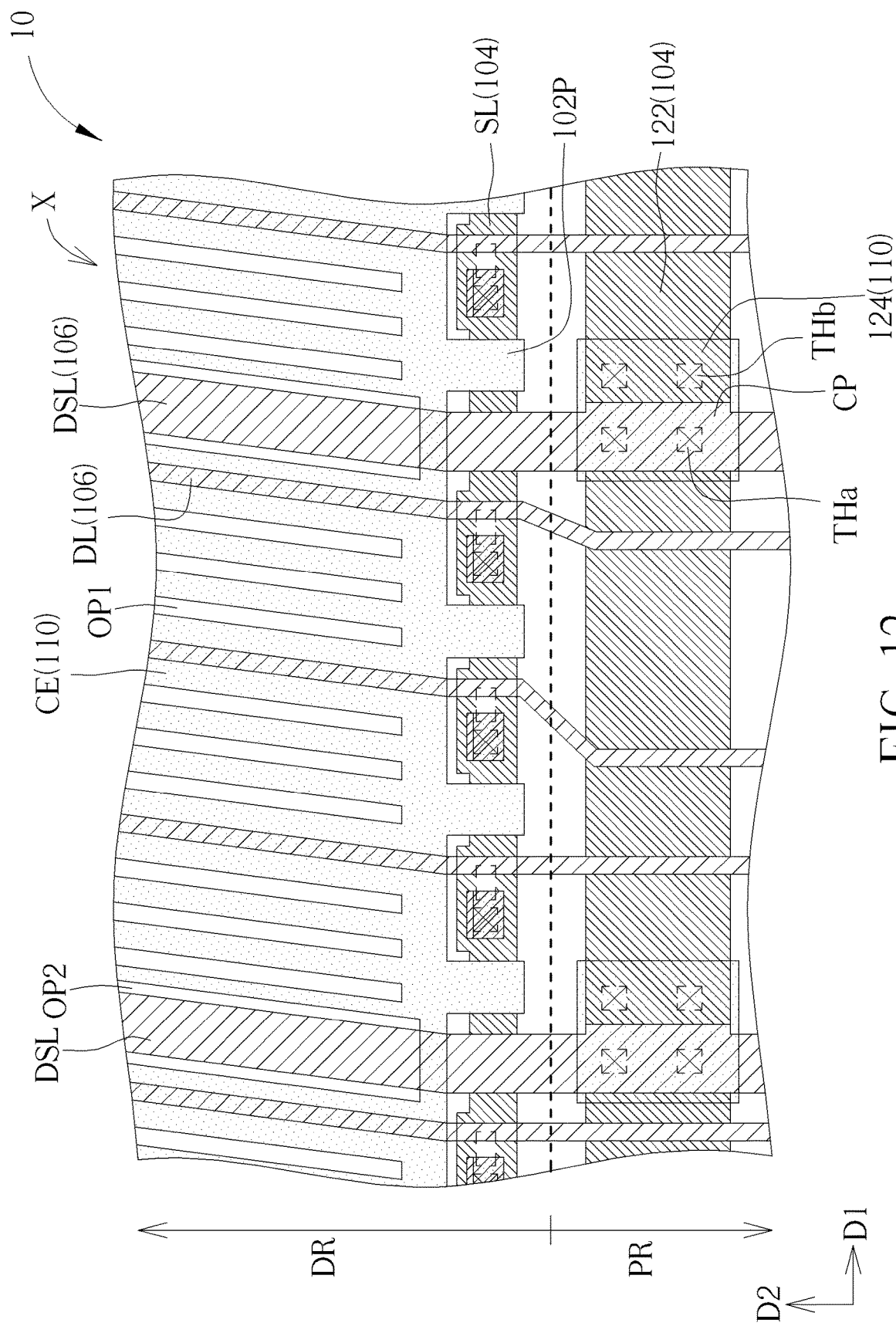
FIG. 12 is a schematic diagram illustrating an enlargement of a region X in FIG. 1.
Figure 13:
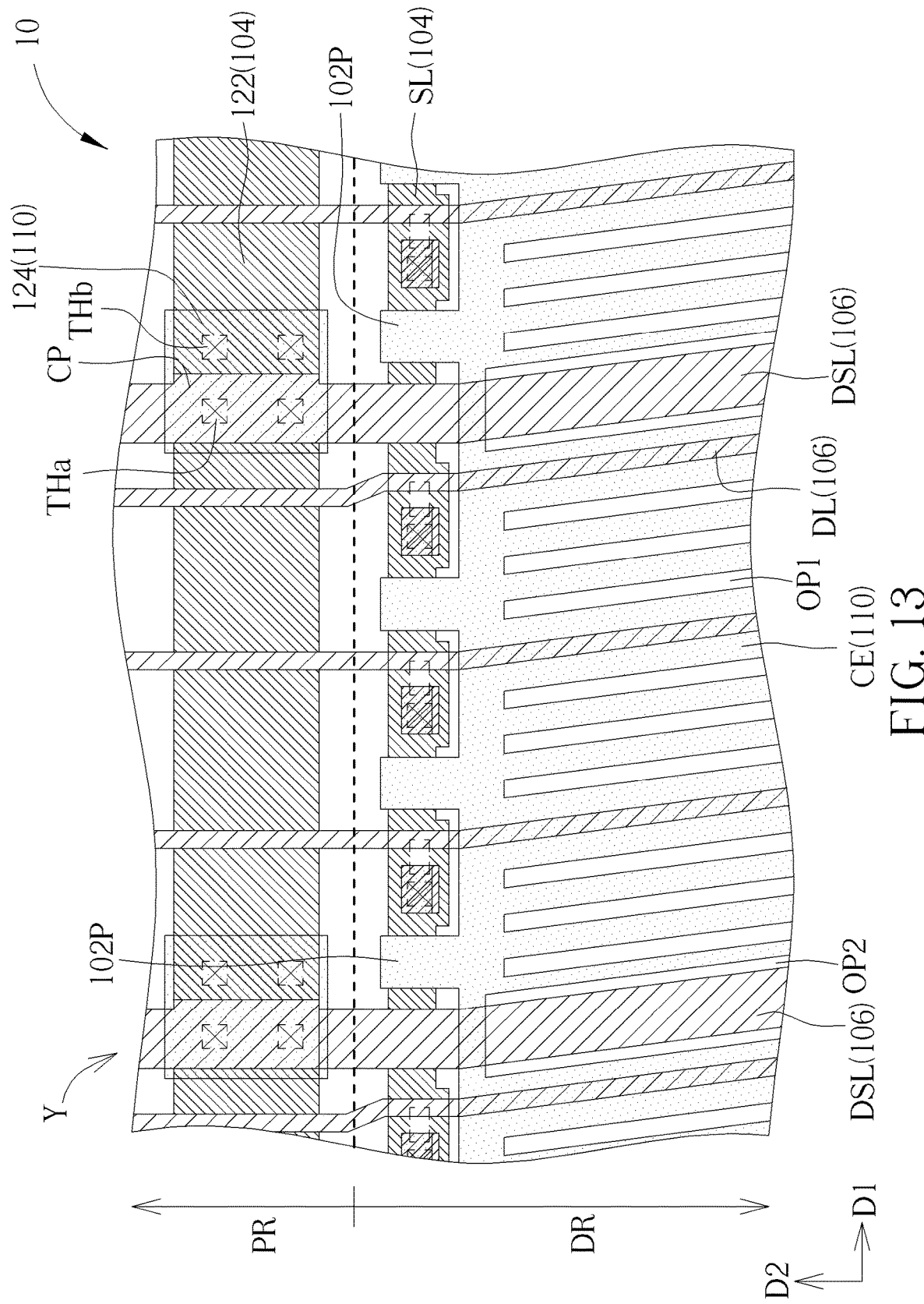
FIG. 13 is a schematic diagram illustrating an enlargement of a region Y in FIG. 1.

Although the electric potential line 122 crosses the touch signal lines SSL as shown in FIG. 1, in fact the electric potential line 122 is not electrically connected to the touch signal lines SSL. The electric potential line 122 and the touch signal lines SSL are electrically isolated. For example, at least a portion of the electric potential line 122 and at least a portion of each of the touch signal lines SSL may be formed of different conductive layers, and at least one insulating layer is disposed between the different conductive layers. FIG. 12 is a schematic diagram illustrating an enlargement of a region X in FIG. 1, and FIG. 13 is a schematic diagram illustrating an enlargement of a region Y in FIG. 1. As shown in FIG. 12 and FIG. 13, portions of the electric potential line 122 in the region X and the region Y extend in the first direction D1, and the electric potential line 122 is disposed close to the display region DR. The electric potential line 122 of this embodiment is a portion of the first metal layer 104, i.e. the electric potential line 122 is formed of the first metal layer 104. The dummy signal lines DSL substantially extend in the second direction D2. The dummy signal lines DSL extend across two opposite edges (e.g. an upper edge and a lower edge) of the display region DR and extend into the peripheral region PR. The dummy signal lines DSL continue extending in the second direction D2 to cross the electric potential line 122 after the dummy signal lines DSL extend out of the display region DR. The dummy signal lines DSL are electrically connected to the electric potential line 122 in this embodiment. For example, each of the dummy signal lines DSL can include a contact pad CP disposed on the electric potential line 122. The insulating layer covering the contact pads CP and the electric potential line 122 includes at least one first contact hole THa and at least one second contact hole THb. Each of the first contact holes THa exposes a portion of the corresponding contact pad CP, and each of the second contact holes THb exposes a portion of the electric potential line 122. In this embodiment, two first contact holes THa are disposed on each of the contact pads CP, and two second contact holes THb adjacent to the first contact holes THa are disposed on the electric potential line 122. The first contact holes THa and the second contact holes THb are arranged in a pattern of 2×2, but the arrangement and the numbers of the first contact holes THa and the second contact holes THb are not limited thereto. Multiple bridge electrodes 124 are disposed on the insulating layer covering the contact pads CP and the electric potential line 122, and each of the bridge electrodes 124 covers the corresponding first contact holes THa and second contact holes THb. Each of the bridge electrodes 124 fills the corresponding first contact holes THa and is in contact with the portions of the corresponding contact pad CP exposed by the first contact holes THa, and each of the bridge electrodes 124 also fills the corresponding second contact holes THb and is in contact with the corresponding portions of the electric potential line 122 exposed by the second contact holes THb. Accordingly, the dummy signal lines DSL and the electric potential line 122 can be electrically connected through the bridge electrodes 124. The bridge electrode 124 may be a portion of the second transparent conductive layer 110 or the first transparent conductive layer 108, and the bridge electrode 124 is separated and electrically isolated from the pixel electrodes PE and the common electrodes CE, but not limited thereto. In a modification, at least one insulating layer is disposed between the electric potential line 122 and the dummy signal lines DSL, and the at least one insulating layer includes at least one contact hole exposing a portion of the electric potential line 122. The dummy signal lines DSL covers the corresponding contact hole, and fills the contact hole and is in contact with the portion of the electric potential line 122 exposed by the contact hole. Therefore, the dummy signal lines DSL and the electric potential line 122 can be electrically connected through the at least one contact hole of the at least one insulating layer between the electric potential line 122 and the dummy signal lines DSL. Additionally, in the embodiment shown in FIG. 12 and FIG. 13, the dummy signal lines DSL extend across two opposite edges (e.g. an upper edge and a lower edge) of the display region DR and extend into the peripheral region PR. The dummy signal lines DSL are electrically connected to a portion of the electric potential line 122 disposed above the display region DR and another portion of the electric potential line 122 disposed below the display region DR in the second direction D2, and the dummy signal lines DSL are electrically connected to the electric potential line 122 through the metal layer transferring structures, but this is not limited thereto. In a modification, the dummy signal lines DSL can only be electrically connected to a portion of the electric potential line 122 disposed above the display region DR or a portion of the electric potential line 122 disposed below the display region DR. In addition, the dummy signal lines DSL may only extend across an edge (e.g. the lower edge) of the display region DR and extend into the peripheral region PR, and the dummy signal lines DSL may be electrically connected to the electric potential line through a metal layer transferring structure disposed on a portion of the electric potential line 122 disposed by a side of the display region DR (e.g. below the display region DR) in the second direction D2. In short, the dummy signal lines DSL can extend across at least one edge of the display region DR and extend into the peripheral region PR, and the dummy signal lines DSL can be electrically connected to the electric potential line 122 through at least one metal layer transferring structure disposed on at least one portion of the electric potential line 122 disposed by at least one side of the display region DR.

The electric potential line 122 can have a fixed electric potential. For example, the electric potential line 122 of this embodiment can be electrically connected to a common voltage source, and the electric potential of the electric potential line 122 can be the common voltage, but this is not limited thereto. In other embodiments, the electric potential of the electric potential line 122 can be grounded (GND) or other fixed electric potentials. Since the electric potential line 122 and the dummy signal lines DSL of this embodiment are electrically connected, the common voltage can be applied to each of the dummy signal lines DSL through the electric potential line 122. Further, the electric potential line 122 of this embodiment can provide electrostatic protection. For example, at least one of the scan lines SL, the data lines DL, or the gate driving circuits 118 can be electrically connected to the electric potential line 122 through the electrostatic protection device. The electrostatic charges in the touch display panel can be discharged to the electric potential line 122 through the electrostatic protection device in a short time. Therefore, the circuit components (e.g. the pixels PX and/or the gate driving circuits 118) can be prevented from being damaged by the electrostatic charges. In addition, the touch display device 10 can further selectively include an outer electric potential line disposed in the peripheral region PR and surrounding the electric potential line 122 (e.g. an inner electric potential line). The IC 116 and the gate driving circuits 118 can be disposed between the outer electric potential line and the electric potential line 122. The outer electric potential line can receive a fixed electric potential (e.g. common voltage or GND) and provide electrostatic protection. Preferably, the electrical potential of the inner electric potential line is the same as that of the outer electric potential line, and the inner electric potential line may be preferably electrically connected to the outer electric potential line through at least one connecting line disposed on the substrate 100, but is not limited thereto. In short, the touch display device 10 can include two electric potential lines. At least one of the scan lines SL, the data lines DL, or the gate driving circuits 118 can be electrically connected to at least one of the inner electric potential line or the outer electric potential line through at least one electrostatic protection device to obtain electrostatic protection. For example, the touch display device 10 includes an inner electric potential line and an outer electric line, at least one conductive connecting pad electrically connected to the IC 116 or circuit board capable of supplying a common voltage is electrically connected to the outer electric line, the inner electric potential line is electrically connected to the outer electric potential line through at least one connecting line disposed on the substrate 100, and the gate driving circuits 118 is electrically connected to the inner electric potential line through at least one electrostatic protection device. When electrostatic charges accumulate in the gate driving circuits 118, the electrostatic charges are discharged to the at least one conductive connecting pad through the at least one electrostatic protection device, the inner electric potential line, the at least one connecting line and the outer electric potential line, thus the gate driving circuits 118 is prevented from damage. In this embodiment, the outer electric potential line can include a non-closed ring structure, but this is not limited thereto. For example, the connecting pads used for coupling to the flexible circuit board are usually disposed at the lower edge of the substrate 100. Therefore, the inner electric potential line can include the closed ring structure (e.g. rectangle structure) and the outer electric potential line can include the non-closed ring structure (e.g. reversed U-shaped structure), and at least a portion of the gap between two ends of the outer electric potential line (e.g. an opening of the reversed U-shaped structure) is located on the lower side of the substrate 100, such that the outer electric potential line can be prevented from being electrically connected to the connecting pads used for coupling to the flexible circuit board.

In addition, the touch display device 10 in some embodiments further includes a plurality of switches disposed in the bonding region 117 for testing defects of the touch electrodes 102 and the touch signal lines SSL. For example, open/short testing can be performed. Each of the switches is coupled to the corresponding second conductive connecting pad BP2, wherein the second conductive connecting pads BP2 are electrically connected to the touch electrodes 102 and the touch signal lines SSL. Each of the switches may be a thin film transistor, and the testing signals can be provided by the switches to the corresponding touch signal lines SSL and the touch electrodes 102 for checking an abnormal phenomenon. For example, the switches include a plurality of first switches and a plurality of second switches. The control terminals (e.g. gates of the thin film transistors) of the first switches and the control terminals of the second switches are electrically connected. Each of the first terminals (e.g. the drain or the source of each thin film transistor) of the first switches is electrically connected to the corresponding odd-numbered touch signal line SSL. Each of the first terminals of the second switches is electrically connected to the corresponding even-numbered touch signal line SSL. The second terminals (e.g. the other one of the drain and the source of each thin film transistor) of the first switches are electrically connected, and the second terminals of the second switches are electrically connected. A turn-on voltage (e.g. high electric potential) is applied to the control terminals of the first switches and the second switches to turn on all the first switches and the second switches when the test is performed. Later, a group of the testing signals is applied to the second terminals of the first switches, and another group of the testing signals is applied to the second terminals of the second switches. Two groups of the testing signals are transmitted to the corresponding touch signal lines SSL and the corresponding touch electrodes 102 through the first switches and the second switches that have been turned on. Additionally, the switches used for testing the data lines DL are also usually disposed in the bonding region 117, therefore the bonding region 117 may not accommodate the switches for testing the touch electrodes 102 and the touch signal lines SSL and the switches for testing the data lines 102 simultaneously as the resolution increases. Therefore, the switches used for testing the touch electrodes 102 and the touch signal lines SSL in some embodiments are disposed in a region between an upper edge of the substrate 100 and an upper edge of the display region DR in FIG. 1. One end of each of the touch signal lines SSL can extend from a lower edge of the display region DR to the bonding region 117 to be coupled to the second conductive connecting pad BP2. The other end of each of the touch signal lines SSL can extend from the upper edge of the display region DR to the switch used for testing the touch electrodes 102 and the touch signal line SSL and disposed between the upper edge of the display region DR and the upper edge of the substrate 100. In short, the touch signal lines SSL substantially extend across two opposite edges (the upper edge and the lower edge) of the display region DR in the second direction D2 and extend into the peripheral region PR. One end of each of the touch signal lines SSL is coupled to the second conductive connecting pad BP2, and the other end of each of the touch signal lines SSL is coupled to the switch used for testing the touch electrodes 102 and the touch signal line SSL.

The touch display device of the present invention is not limited to the aforementioned embodiment. The following description can be applied to other embodiments or modifications. To simplify the description and show the difference between other embodiments, modifications and the above-mentioned embodiment, identical components in each of the following embodiments are marked with identical symbols, and the identical features will not be redundantly described.

Figure 14:
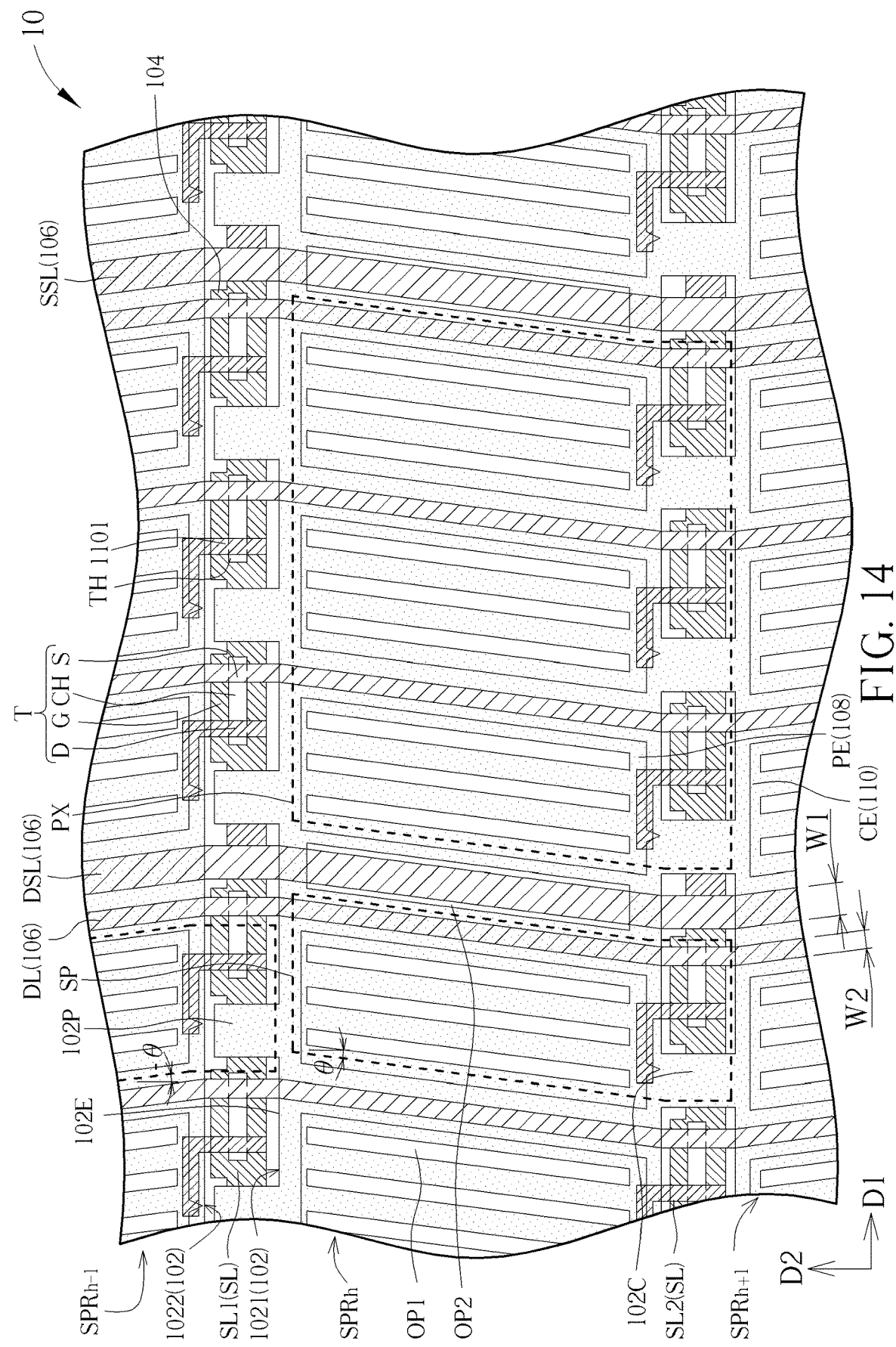
FIG. 14 is a schematic diagram illustrating a top view of a portion of the display region of the touch display device according to a second embodiment of the present invention.
Figure 15:
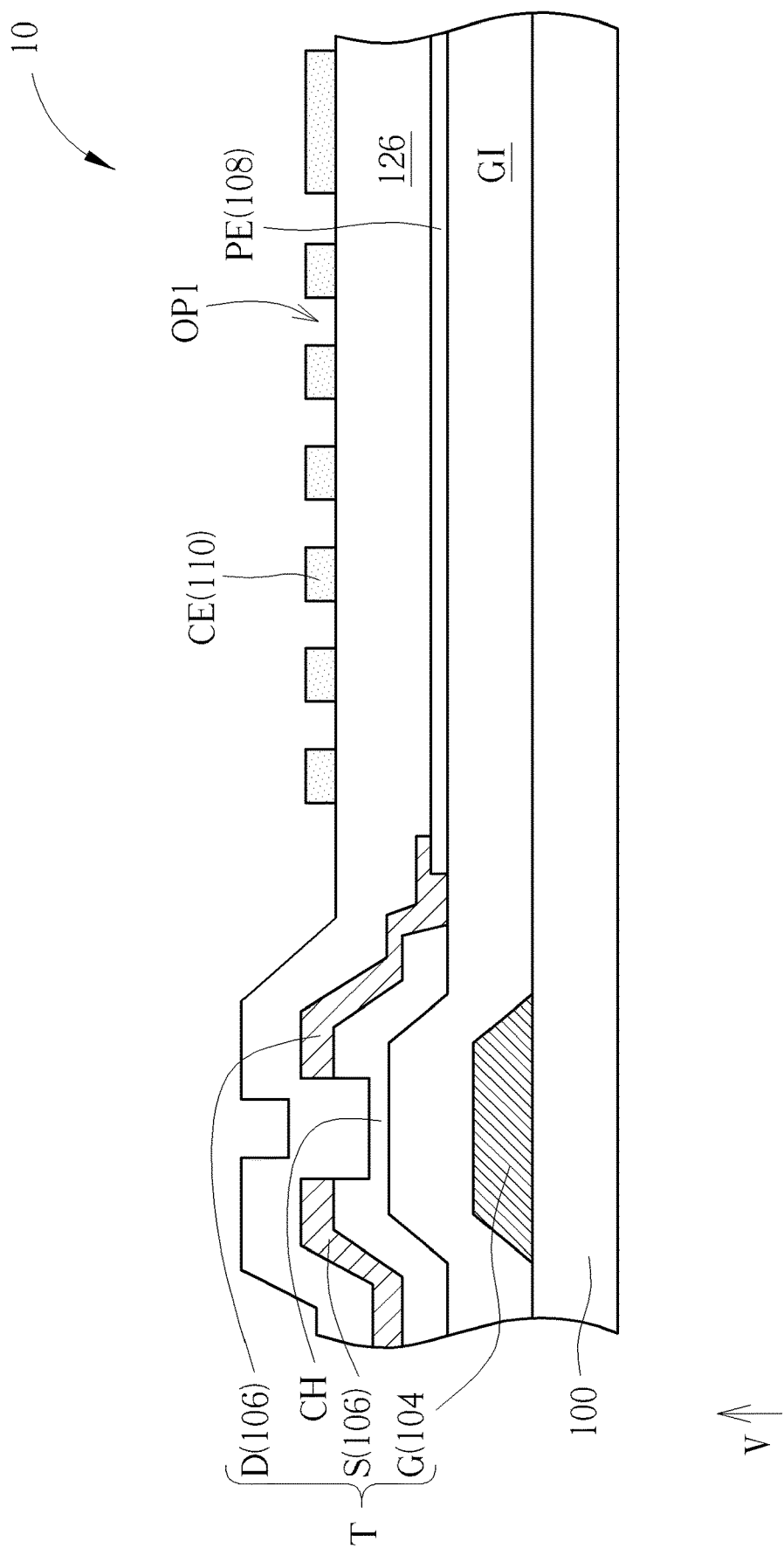
FIG. 15 is a schematic diagram illustrating a cross-sectional view of a sub-pixel of the touch display device according to the second embodiment of the present invention.

FIG. 14 is a schematic diagram illustrating a top view of a portion of the display region of the touch display device according to a second embodiment of the present invention, and FIG. 15 is a schematic diagram illustrating a cross-sectional view of a sub-pixel of the touch display device according to the second embodiment of the present invention. As shown in FIG. 14 and FIG. 15, in the structure of each of the sub-pixels SP in this embodiment, a portion of the pixel electrode PE of the first transparent conductive layer 108 is disposed between the drain D of the second metal layer 106 and the gate insulating layer GI, where the pixel electrode PE is directly in contact with a portion of the drain D, but is not limited thereto. In this embodiment, the pixel electrodes PE can be formed after the gate insulating layer GI is formed, and the drains D can be formed afterward. Additionally, each of the drains D covers and is in contact with a portion of one of the pixel electrodes PE. In the structure of each of the sub-pixels SP in a modification, a portion of the drain D can be disposed between the pixel electrode PE and the gate insulating layer GI, and the portion of the drain D is directly in contact with the pixel electrode PE. In this modification, the drains D can be formed after the gate insulating layer GI is formed, and the pixel electrodes PE can be formed afterward. Additionally, each of the pixel electrodes PE covers and is in contact with a portion of one of the drains D. In this embodiment, an insulating layer 126 is disposed between the second metal layer 106 and the second transparent conductive layer 110 and disposed between the second transparent conductive layer 110 and the first transparent conductive layer 108. The material of the insulating layer 126 can be the same as that of the first insulating layer 112 or the second insulating layer 114 in the first embodiment, but is not limited thereto. The thickness of the insulating layer 126 of this embodiment can be greater than the thickness of the first insulating layer 112 or the thickness of the second insulating layer 114 of the first embodiment, but is not limited thereto. For example, the thickness of the insulating layer 126 of this embodiment can be greater than or equal to 5500 angstroms to reduce the C loading of the common electrodes CE and the data lines DL or the C loading of the common electrodes CE and the scan lines SL, but is not limited thereto. Technical features in the display region DR or the peripheral region PR of the touch display device 10 in this embodiment are the same as the first embodiment, and will not be redundantly described here.

In summary, in the touch display device of the present invention, the touch electrodes include the protruding portions at the edges (or the disconnection locations), and the overlapping areas of the touch electrodes and the scan lines at the edges of the touch electrodes are equal to the overlapping areas of the touch electrodes and the scan lines inside the touch electrodes, thus the difference between the resistive-capacitive loading of the touch electrodes and the scan lines at the edges of the touch electrodes and the resistive-capacitive loading of the touch electrodes and the scan lines inside the touch electrodes can be reduced. Each of the second openings in the touch electrodes exposes a portion of one of the touch signal lines, meaning the overlapping areas of the touch electrodes and the touch signal lines can be reduced, and the C loading of the touch electrodes and the touch signal lines can be reduced. The above technical features can make the touch display device achieve a better signal transmission effect. In addition, the dummy signal lines and the touch signal lines are divided into a plurality of groups in the touch display device of the present invention. In each group of the dummy signal lines and the touch signal lines, the touch signal lines are disposed between a portion of the dummy signal lines and another portion of the dummy signal lines. Each of the dummy signal lines and each of the touch signal lines do not require crossing at least three data lines in the peripheral region. Therefore, two of the adjacent data lines can be formed of different metal layers and overlap each other, each of the dummy signal lines and the adjacent data line can be formed of different metal layers and overlap each other, and each of the touch signal lines and the adjacent data line can be formed of different metal layers and overlap each other in the peripheral region, and the area of disposing the dummy signal lines, the touch signal lines, and the data lines in the peripheral region can be reduced. In addition, the electric potential line in the touch display device can provide common voltage to the dummy signal lines and the electrostatic protection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display device comprising a display region and a peripheral region, the touch display device comprising:
   a substrate;
   a plurality of scan lines and a plurality of data lines disposed on the substrate;
   a plurality of thin film transistors disposed on the substrate, wherein each of the thin film transistors is electrically connected to a corresponding scan line of the plurality of scan lines and a corresponding data line of the plurality of data lines;
   a plurality of pixel electrodes disposed on the substrate and in the display region, wherein each of the pixel electrodes is electrically connected to a drain of a corresponding thin film transistor of the plurality of thin film transistors;
   a plurality of touch electrodes and a plurality of touch signal lines disposed on the substrate, wherein each of the touch signal lines is electrically connected to a corresponding touch electrode of the plurality of touch electrodes; and
   a plurality of dummy signal lines disposed on the substrate, wherein the plurality of touch electrodes are arranged in i number of touch electrode columns in a first direction and arranged in j number of touch electrode rows in a second direction, the first direction is not parallel to the second direction, the plurality of touch signal lines and the plurality of dummy signal lines are divided into i number of groups in the first direction, each of the i number of groups comprises j number of touch signal lines of the plurality of touch signal lines and k number of dummy signal lines of the plurality of dummy signal lines, and the j number of touch signal lines are disposed between a portion of the k number of dummy signal lines and a remaining portion of the k number of dummy signal lines in each of the i number of groups, wherein i, j, and k are positive integers greater than or equal to two.

2. The touch display device of claim 1, wherein each of the plurality of touch signal line and each of the plurality of dummy signal lines substantially extend along the second direction.

3. The touch display device of claim 1, a width of each of the plurality of dummy signal lines is substantially the same as a width of each of the plurality of touch signal lines in the display region.

4. The touch display device of claim 1, each of the i number of touch electrode columns comprises j number of touch electrodes of the plurality of touch electrodes, and each of the plurality of touch signal line penetrates a region corresponding to the j number of touch electrodes in a corresponding one of the i number of touch electrode columns.

5. The touch display device of claim 1, wherein the j number of touch signal lines are disposed between m number of the k number of dummy signal lines and (k-m) number of the k number of dummy signal lines in one of the i number of groups, and the j number of touch signal lines are disposed between n number of the k number of dummy signal lines and (k-n) number of dummy signal lines of the k number of dummy signal lines in another one of the i number of groups, wherein m and n are positive integers greater than or equal to one, each of m and n is smaller than k, and n is different from m.

6. The touch display device of claim 1, wherein the j number of touch signal lines are disposed between m number of the k number of dummy signal lines and (k-m) number of dummy signal lines of the k number of dummy signal lines in each of the i number of groups, wherein m is an integer greater than or equal to one, and m is smaller than k.

7. The touch display device of claim 1, wherein the plurality of scan lines cross the plurality of data lines to define a plurality of sub-pixels, the plurality of sub-pixels are arranged in a plurality of sub-pixel columns in the first direction and arranged in a plurality of sub-pixel rows in the second direction, one of the plurality of touch signal lines or one of the plurality of dummy signal lines is disposed adjacent to one of the plurality of sub-pixel columns or disposed between two adjacent sub-pixel columns of the plurality of sub-pixel columns.

8. The touch display device of claim 1, wherein three data lines of the plurality of data lines, a touch signal line of the plurality of touch signal lines, another three data lines of the plurality of data lines and another touch signal line of the plurality of touch signal lines are sequentially disposed along the first direction in the display region.

9. The touch display device of claim 1, wherein three data lines of the plurality of data lines, a touch signal line of the plurality of touch signal lines, another three data lines of the plurality of data lines and a dummy signal line of the plurality of dummy signal lines are sequentially disposed along the first direction in the display region.

10. The touch display device of claim 1, wherein the plurality of scan lines are formed of a first metal layer in the display region, and the plurality of data lines, the plurality of touch signal lines and the plurality of dummy signal lines are formed of a second metal layer in the display region.

11. The touch display device of claim 1, wherein the plurality of data lines comprise a first data line, a second data line and a third data line, the first data line, the second data line and the third data line are sequentially disposed along the first direction in the display region, the first data line is at least partially overlapped with the second data line in the peripheral region, and the third data line is at least partially overlapped with one of the plurality of touch signal lines in the peripheral region.

12. The touch display device of claim 1, wherein the plurality of data lines comprise a first data line, a second data line and a third data line, the first data line, the second data line and the third data line are sequentially disposed along the first direction in the display region, the first data line is at least partially overlapped with the second data line in the peripheral region, and the third data line is at least partially overlapped with one of the plurality of dummy signal lines in the peripheral region.

13. The touch display device of claim 1, wherein the plurality of data lines comprise a first data line, a second data line and a third data line, the first data line, the second data line and the third data line are sequentially disposed along the first direction in the display region, the first data line is at least partially overlapped with one of the plurality of touch signal lines in the peripheral region, and the second data line is at least partially overlapped with the third data line in the peripheral region.

14. The touch display device of claim 1, wherein the plurality of data lines comprise a first data line, a second data line and a third data line, the first data line, the second data line and the third data line are sequentially disposed along the first direction in the display region, the first data line is at least partially overlapped with one of the plurality of dummy signal lines in the peripheral region, and the second data line is at least partially overlapped with the third data line in the peripheral region.

15. The touch display device of claim 1, wherein the touch display device further comprises an electric potential line disposed on the substrate and in the peripheral region, the plurality of dummy signal lines are electrically connected to the electric potential line, and the electric potential line has a fixed electric potential.

16. The touch display device of claim 15, wherein an electric potential of the electric potential line is a common voltage.

17. The touch display device of claim 15, wherein the electric potential line surrounds the display region.

18. The touch display device of claim 15, wherein the touch display device further comprises a gate driving circuit disposed on the substrate and in the peripheral region, the gate driving circuit is electrically connected to the plurality of scan lines, and a portion of the electric potential line is disposed between the gate driving circuit and the display region.

* * * * *